(12) United States Patent
Tamagawa

(10) Patent No.: US 12,112,218 B2
(45) Date of Patent: Oct. 8, 2024

(54) CHART MANUFACTURING APPARATUS, CHART MANUFACTURING METHOD, PROGRAM, AND IMAGE FORMING SYSTEM

(71) Applicant: FUJIFILM Corporation, Tokyo (JP)

(72) Inventor: Kiyomi Tamagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/476,319

(22) Filed: Sep. 28, 2023

(65) Prior Publication Data

US 2024/0020499 A1    Jan. 18, 2024

Related U.S. Application Data

(63) Continuation of application No. PCT/JP2022/012545, filed on Mar. 18, 2022.

(30) Foreign Application Priority Data

Apr. 5, 2021   (JP) ................................ 2021-064305

(51) Int. Cl.
  *G06K 15/02*    (2006.01)
  *G06K 15/10*    (2006.01)
(52) U.S. Cl.
  CPC ......... *G06K 15/023* (2013.01); *G06K 15/102* (2013.01); *G06K 15/1868* (2013.01); *G06K 15/1878* (2013.01)
(58) Field of Classification Search
  CPC ............... G06K 15/023; G06K 15/102; G06K 15/1868; G06K 15/1878; G06K 15/027;
(Continued)

(56) References Cited

U.S. PATENT DOCUMENTS 8,469,471 B2 *  6/2013  Kikuchi ............... B41J 2/17546
                                                347/14
9,979,860 B2 *  5/2018  Yamaguchi .......... H04N 1/6008
(Continued)

FOREIGN PATENT DOCUMENTS

JP     2003187226     7/2003
JP     2011073306     4/2011
(Continued)

OTHER PUBLICATIONS

"International Search Report (Form PCT/ISA/210) of PCT/JP2022/012545," mailed on Jun. 7, 2022, with English translation thereof, pp. 1-5.

(Continued)

*Primary Examiner* — Negussie Worku
(74) *Attorney, Agent, or Firm* — JCIPRNET

(57) ABSTRACT

There are provided a chart manufacturing apparatus, a chart manufacturing method, a program, and an image forming system that do not need to switch backgrounds in a case of measuring a chart using two types of backgrounds having colors different from each other. The chart manufacturing apparatus that forms, on a transparent substrate, a chart (102) measured by applying a first background color and a second background color, forms a first measurement background image (130) on a transparent substrate (100) using a coloring material corresponding to a first background color, forms a first patch group (122) including one or more first patches (126) using a coloring material of a first color at a position corresponding to the first measurement background image, and forms a second patch group (120) including one or more second patches (124) at a position where the first measurement background image is not formed.

18 Claims, 16 Drawing Sheets

(58) Field of Classification Search
CPC ....... B41J 2202/21; B41J 2/2117; H04N 1/54; H04N 1/6033; G06T 7/90
USPC .......................................................... 358/1.9
See application file for complete search history.

(56) References Cited

U.S. PATENT DOCUMENTS

| | | | |
|---|---|---|---|
| 10,267,683 B2* | 4/2019 | Tanimura | H04N 1/46 |
| 10,367,975 B2* | 7/2019 | Kurumaya | G01J 3/52 |
| 2003/0112455 A1* | 6/2003 | Ueda | H04N 1/6033 |
| | | | 358/1.9 |
| 2004/0161257 A1* | 8/2004 | Ishihara | G06K 15/00 |
| | | | 399/81 |
| 2009/0290180 A1* | 11/2009 | Onoda | H04N 1/603 |
| | | | 358/1.9 |
| 2011/0050772 A1 | 3/2011 | Kamijo | |
| 2012/0081436 A1 | 4/2012 | Yamada et al. | |
| 2016/0301830 A1* | 10/2016 | Shibata | H04N 1/00323 |
| 2017/0043591 A1 | 2/2017 | Waidman et al. | |
| 2017/0310854 A1* | 10/2017 | Yamaguchi | H04N 1/6008 |
| 2017/0314994 A1* | 11/2017 | Tanimura | H04N 1/60 |
| 2018/0126747 A1 | 5/2018 | Katsuno et al. | |
| 2018/0290180 A1* | 10/2018 | Luby | B08B 3/026 |
| 2019/0145827 A1* | 5/2019 | Van Renterghem | G01J 3/522 |
| | | | 356/423 |
| 2019/0387126 A1 | 12/2019 | Shiraki | |
| 2021/0319275 A1* | 10/2021 | Yamaya | G06K 15/102 |

FOREIGN PATENT DOCUMENTS

| | | |
|---|---|---|
| JP | 2012076412 | 4/2012 |
| JP | 2012232499 | 11/2012 |
| JP | 2014116667 | 6/2014 |
| JP | 2015058648 | 3/2015 |
| JP | 2019220782 | 12/2019 |

OTHER PUBLICATIONS

"Written Opinion of the International Searching Authority (Form PCT/ISA/237) of PCT/JP2022/012545," mailed on Jun. 7, 2022, with English translation thereof, pp. 1-8.

"Search Report of Europe Counterpart Application", issued on Jun. 28, 2024, pp. 1-9.

* cited by examiner

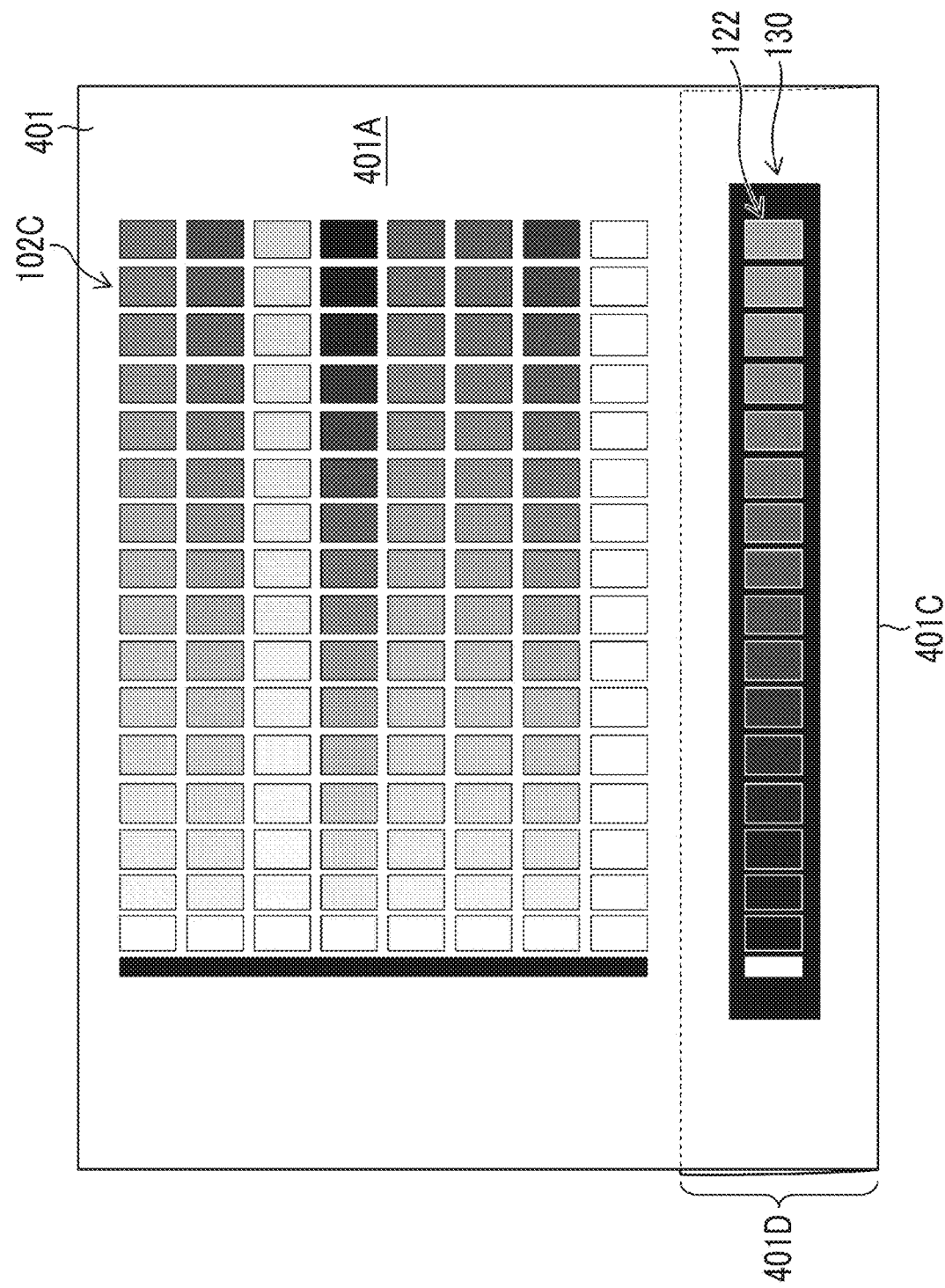

CHART MANUFACTURING APPARATUS, CHART MANUFACTURING METHOD, PROGRAM, AND IMAGE FORMING SYSTEM

CROSS-REFERENCE TO RELATED APPLICATIONS

The present application is a Continuation of PCT International Application No. PCT/JP2022/012545 filed on Mar. 18, 2022 claiming priority under 35 U.S.C § 119(a) to Japanese Patent Application No. 2021-064305 filed on Apr. 5, 2021. Each of the above applications is hereby expressly incorporated by reference, in its entirety, into the present application.

BACKGROUND OF THE INVENTION

1. Field of the Invention

The present invention relates to a chart manufacturing apparatus, a chart manufacturing method, a program, and an image forming system.

2. Description of the Related Art

An ink jet printing device, in which a white ink is applied in formation of a base of a printed material or the like using a transparent substrate, is known. For example, a color image is printed, and an entire surface image of the white ink is printed to be superimposed on the color image. In a case where the printed material which is printed in such a manner is viewed from a surface on an opposite side to a printed surface, the color image is visually recognized on a white background.

The density of the white ink can be managed as an indicator of a covering ratio. The covering ratio represents a degree to which the white ink applied to the substrate covers a color of an underlayer of the white ink such as a base of the substrate. In a case where the covering ratio is derived, the white ink is measured using the white background and a black background.

JP2011-73306A describes a printing device that acquires an error of an adhesion amount of an ink adhered to a transparent substrate and that corrects the adhesion amount of the ink based on the error. In the device described in JP2011-73306A, a white patch and a patch of a process color such as cyan are printed on the transparent substrate, the color of the patch is measured in a Lab space, and color correction based on the measurement data is executed.

In FIG. 17 of JP2011-73306A, a black-and-white background is used, a white background is applied to cyan, magenta, yellow, and black, and white is shown for color measurement with a black background applied.

JP2012-232499A describes a printing device that comprises a switching mechanism which switches between a white background and a black background, in which the black background is applied to reading of a white ink, in which the white background is applied to reading of a black ink or the like, and that accurately detects a defective nozzle for various inks.

JP2019-220782A describes an image forming device that comprises an image reading unit which reads an image formed on a transparent support. The device described in JP2019-220782A determines whether to set a background color in a case of reading an image to black or white and sets the background color based on the determination result.

SUMMARY OF THE INVENTION

However, the devices described in JP2011-73306A, JP2012-232499A, and JP2019-220782A respectively comprise a component that switches between a white background and a black background and execute switching of background colors. That is, none of JP2011-73306A, JP2012-232499A, and JP2019-220782A describes a device related to a chart for setting a background color to one type. In other words, none of the inventions described in JP2011-73306A, JP2012-232499A, and JP2019-220782A has an object to form a chart without switching background colors.

The present invention is devised in view of such circumstances, and an object thereof is to provide a chart manufacturing apparatus, a chart manufacturing method, a program, and an image forming system that do not need to switch backgrounds in a case of measuring a chart using two types of backgrounds having colors different from each other.

According to an aspect of the present disclosure, there is provided a chart manufacturing apparatus comprising an image forming device that forms, on a transparent substrate, a chart measured by applying a first background color and a second background color which are colors different from each other, one or more processors, and a storage that stores a program executed using the one or more processors, in which the one or more processors are configured to execute a command of the program, form a first measurement background image on the transparent substrate using a coloring material corresponding to the first background color, form a first patch group including one or more first patches using a coloring material of a first color at a position of the transparent substrate, which corresponds to the first measurement background image, and form a second patch group including one or more second patches at a position of the transparent substrate where the first measurement background image is not formed.

With the chart manufacturing apparatus according to the present disclosure, the transparent substrate is supported by applying a background in which the second background color is used. In a case where the first patch group and the second patch group are measured, the first patch group is measured with the first measurement background image to which the coloring material corresponding to the first background color is applied as a background, and the second patch group is measured by applying a background in which the second background color is used. Accordingly, in a case where the first patch group is measured and the second patch group is measured, switching between the first background color and the second background color which are different from each other is unnecessary.

A small piece image indicating the density for each color can be applied to a patch. A quadrangular shape can be applied to the shape of the patch.

A substrate having a visible light transmittance of less than 100 percent can be applied to the transparent substrate.

Examples of the coloring material include an ink and a toner.

In the chart manufacturing apparatus according to another aspect, the one or more processors are configured to form the first measurement background image on one surface of the transparent substrate and form the first patch group to be superimposed on the first measurement background image.

According to such an aspect, the chart can be formed by superimposing the first patch group on the first measurement background image.

In the chart manufacturing apparatus according to still another aspect, the one or more processors are configured to form a transparent image to which a transparent coloring material is applied to be superimposed on the first measurement background image and form the first patch group to be superimposed on the transparent image.

According to such an aspect, color mixing of the coloring material applied to the first measurement background image and the coloring material applied to the first patch group can be suppressed.

In the chart manufacturing apparatus according to still another aspect, the one or more processors are configured to form the first patch group on one surface of the transparent substrate and form the first measurement background image at a position of the other surface of the transparent substrate, which corresponds to a position of the first patch group.

According to such an aspect, color mixing of the coloring material applied to the first measurement background image and the coloring material applied to the first patch group can be suppressed.

Such an aspect is suitable for a double-sided machine that can form an image on both sides of the transparent substrate.

In the chart manufacturing apparatus according to still another aspect, the one or more processors are configured to form the first patch group on one surface of the transparent substrate and form the first measurement background image at a position superimposed on the first patch group in a case where the transparent substrate is folded back along a folding-back line.

According to such an aspect, the transparent substrate can be folded back along the folding-back line, and the first patch group can be superimposed on the first measurement background image.

In the chart manufacturing apparatus according to still another aspect, the one or more processors are configured to form the second patch using the coloring material of the first color.

According to such an aspect, the first patch and the second patch formed using the coloring material of the first color can be measured using background colors different from each other.

In the chart manufacturing apparatus according to still another aspect, the one or more processors are configured to form the first patch and the second patch using a white coloring material as the coloring material of the first color and form the first measurement background image using a black coloring material as the coloring material corresponding to the first background color.

According to such an aspect, the white patch can be measured by applying a white background and a black background.

In the chart manufacturing apparatus according to still another aspect, the one or more processors are configured to form the second patch using a coloring material of a second color different from the coloring material of the first color.

According to such an aspect, a chart including patch groups of a plurality of colors can be formed.

In the chart manufacturing apparatus according to still another aspect, the one or more processors are configured to form the first patch using a white coloring material as the coloring material of the first color, form the second patch using a coloring material of at least one process color as the second color, and form the first measurement background image using a black coloring material as the coloring material corresponding to the first background color.

According to such an aspect, the white patch can be measured by applying the black background, and a patch of the process color can be measured by applying the white background.

In the chart manufacturing apparatus according to still another aspect, the one or more processors are configured to form a second measurement background image at a position corresponding to a position of the second patch group using a coloring material corresponding to the second background color.

According to such an aspect, regardless of the color of the surface supporting the transparent substrate, measurement to which the first measurement background image and the second measurement background image are applied can be executed.

In the chart manufacturing apparatus according to still another aspect, the one or more processors are configured to form the second measurement background image using a white coloring material as the coloring material corresponding to the second background color.

According to such an aspect, the second patch can be measured by applying the white second measurement background image.

In the chart manufacturing apparatus according to still another aspect, the one or more processors are configured to form the second measurement background image that has coverage of 85 percent or more.

According to such an aspect, the transparency of the second measurement background image is suppressed.

In the chart manufacturing apparatus according to still another aspect, the one or more processors are configured to form the first patch using a white coloring material as the coloring material of the first color and form the first measurement background image using a black coloring material as the coloring material corresponding to the first background color.

According to such an aspect, the white first patch can be measured by applying the black first measurement background image.

In the chart manufacturing apparatus according to still another aspect, the one or more processors are configured to form the first measurement background image that has coverage of 85 percent or more.

According to such an aspect, the transparency of the first measurement background image is suppressed.

In the chart manufacturing apparatus according to still another aspect, the one or more processors are configured to form the second patch to which the same gradation value as the first patch is applied.

According to such an aspect, management of the color applied to the first patch and the color applied to the second patch can be made common.

In the chart manufacturing apparatus according to still another aspect, the one or more processors are configured to form the first patch group in which a plurality of the first patches having gradation values different from each other are disposed along a transport direction of the transparent substrate and form the second patch group in which a plurality of the second patches of the same color having gradation values different from each other are disposed along the transport direction of the transparent substrate.

According to such an aspect, in a case of forming using a line head, occurrence of in-plane unevenness for each patch is suppressed.

According to still another aspect of the present disclosure, there is provided a chart manufacturing method of forming, on a transparent substrate, a chart measured by applying a first background color and a second background color which are colors different from each other, the method comprising causing a computer to form a first measurement background image on the transparent substrate using a coloring material corresponding to the first background color, form a first patch group including one or more first patches using a coloring material of a first color at a position of the transparent substrate, which corresponds to the first measurement background image, and form a second patch group including one or more second patches at a position of the transparent substrate where the first measurement background image is not formed.

With the chart manufacturing method according to the present disclosure, the same operational effects as the chart manufacturing apparatus according to the present disclosure can be obtained. Configuration requirements of the chart manufacturing apparatus according to another aspect can be applied to configuration requirements of the chart manufacturing method according to another aspect.

According to still another aspect of the present disclosure, there is provided a program that manufactures a chart measured by applying a first background color and a second background color which are colors different from each other, the program comprising causing a computer to realize a function of forming a first measurement background image on a transparent substrate using a coloring material corresponding to the first background color, a function of forming a first patch group including one or more first patches using a coloring material of a first color at a position of the transparent substrate, which corresponds to the first measurement background image, and a function of forming a second patch group including one or more second patches at a position of the transparent substrate where the first measurement background image is not formed.

With the program according to the present disclosure, the same operational effects as the chart manufacturing apparatus according to the present disclosure can be obtained. Configuration requirements of the chart manufacturing apparatus according to another aspect can be applied to configuration requirements of the program according to another aspect.

According to still another aspect of the present disclosure, there is provided an image forming system comprising an image forming device that forms, on a transparent substrate, a chart measured by applying a first background color and a second background color which are colors different from each other, a processor, and a storage that stores a program executed using the one or more processors, in which the one or more processors are configured to execute a command of the program, form a first measurement background image on the transparent substrate using a coloring material corresponding to the first background color, form a first patch group including one or more first patches using a coloring material of a first color at a position of the transparent substrate, which corresponds to the first measurement background image, and form a second patch group including one or more second patches at a position of the transparent substrate where the first measurement background image is not formed.

With the image forming system according to the present disclosure, the same operational effects as the chart manufacturing apparatus according to the present disclosure can be obtained. Configuration requirements of the chart manufacturing apparatus according to another aspect can be applied to configuration requirements of the image forming system according to another aspect.

An example of the image forming system includes an ink jet printing system comprising a printing device using an ink jet method.

With the present invention, the transparent substrate is supported by applying a background in which the second background color is used. In a case where the first patch group and the second patch group are measured, the first patch group is measured with the first measurement background image to which the coloring material corresponding to the first background color is applied as a background, and the second patch group is measured by applying a background in which the second background color is used. Accordingly, in a case where the first patch group is measured and the second patch group is measured, switching between the first background color and the second background color which are different from each other is unnecessary.

BRIEF DESCRIPTION OF THE DRAWINGS

FIG. 18 is a schematic diagram showing a measurement state of the chart shown in FIG. 17.

DESCRIPTION OF THE PREFERRED EMBODIMENTS

Figure 1:
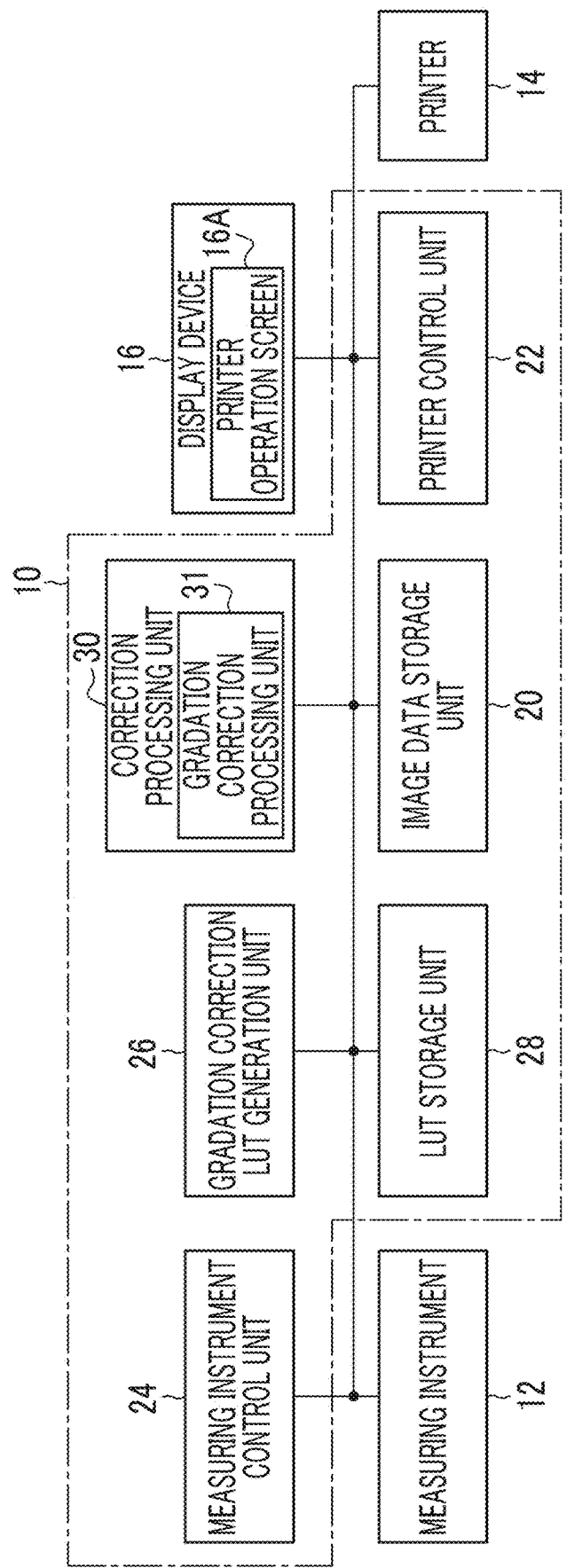
FIG. 1 is a functional block diagram of a gradation correction data generation apparatus.

Hereinafter, preferable embodiments of the present invention will be described in detail with reference to the accompanying drawings. In the present specification, the same components will be assigned with the same reference numerals, and redundant description thereof will be omitted as appropriate.

Configuration Example of Gradation Correction Data Generation Apparatus

FIG. 1 is a functional block diagram of a gradation correction data generation apparatus. A gradation correction data generation apparatus 10 shown in FIG. 1 is connected to a measuring instrument 12, a printer 14, and a display device 16.

The gradation correction data generation apparatus 10 generates gradation correction data applied to correction of non-linearity between a gradation value and a density value with respect to image data printed by applying the printer 14. The printer 14 performs printing based on the image data to which the gradation value corrected by applying the gradation correction data is applied. Hereinafter, the printer 14 will be described as an ink jet printing device comprising an ink jet head.

The gradation correction data generation apparatus 10 comprises an image data storage unit 20. The image data storage unit 20 stores a gradation correction chart to be printed on a substrate. In addition, the image data storage unit 20 can store data indicating a density target value for each gradation value reproduced in a case where the gradation correction chart is printed. Storage means saving of data to a memory and is synonymous with storing, recording, retention, and the like.

The gradation correction data generation apparatus 10 comprises a printer control unit 22. The printer control unit 22 reads out gradation correction chart data from the image data storage unit 20 and generates a jetting control signal based on the gradation correction chart data. The printer 14 prints a gradation correction chart based on the jetting control signal.

The printer control unit 22 displays various types of information related to the printer 14 on the display device 16. A touch panel method is applied to the display device 16, and the display device 16 displays a printer operation screen 16A. A user can transmit various types of information to the printer 14 by operating the printer operation screen 16A.

The measuring instrument 12 measures a density value of a patch configuring a gradation correction chart to be printed on a substrate. A spectrophotometric densitometer can be applied to the measuring instrument 12. The measuring instrument 12 transmits a measurement result to a gradation correction LUT generation unit 26.

The gradation correction data generation apparatus 10 comprises a measuring instrument control unit 24. The measuring instrument control unit 24 sets measurement conditions for the measuring instrument 12 and controls measurement of a gradation correction chart using the measuring instrument 12.

The gradation correction data generation apparatus 10 comprises the gradation correction LUT generation unit 26 and an LUT storage unit 28. The gradation correction LUT generation unit 26 generates a gradation correction LUT in which a conversion relationship between a gradation value and a density value is specified. The LUT is an abbreviation of a lookup table.

Specifically, measurement data of a patch for each gradation value of a gradation correction chart and a target density value for each gradation value are compared with each other, a gradation value for realizing a target density value is derived, and a gradation correction LUT indicating a conversion relationship between a gradation value and a density value is generated.

The gradation correction LUT generation unit 26 generates a gradation correction LUT for each color. The gradation correction LUT generation unit 26 generates a gradation correction LUT for each of various types of conditions such as an ink type, a substrate type, and printer setting. The generation of the gradation correction LUT herein can include an aspect of updating the existing gradation correction LUT.

The LUT storage unit 28 stores a gradation correction LUT generated using the gradation correction LUT generation unit 26. The LUT storage unit 28 stores a gradation correction LUT for each color and for each of various types of conditions.

The gradation correction data generation apparatus 10 comprises a correction processing unit 30. The correction processing unit 30 comprises a gradation correction processing unit 31. In addition, the correction processing unit 30 can include various types of correction processing units applied to gradation correction chart data such as an in-plane unevenness correction processing unit and a non-jetting nozzle correction processing unit. In FIG. 1, showing of various types of correction processing units, such as the in-plane unevenness correction processing unit, is omitted.

The gradation correction processing unit 31 corrects a gradation value with reference to a gradation correction LUT for each color. The printer control unit 22 generates a jetting control signal based on gradation correction chart data for correcting a gradation value and transmits the jetting control signal to the printer 14. The printer 14 prints a gradation correction chart based on the jetting control signal.

The image data storage unit 20, the correction processing unit 30, the printer control unit, and the printer 14 in the gradation correction data generation apparatus 10 shown in FIG. 1 configure a chart manufacturing apparatus according to the embodiment. Details of the chart manufacturing apparatus will be described later.

Configuration Example of Correction Processing Unit

Figure 2:
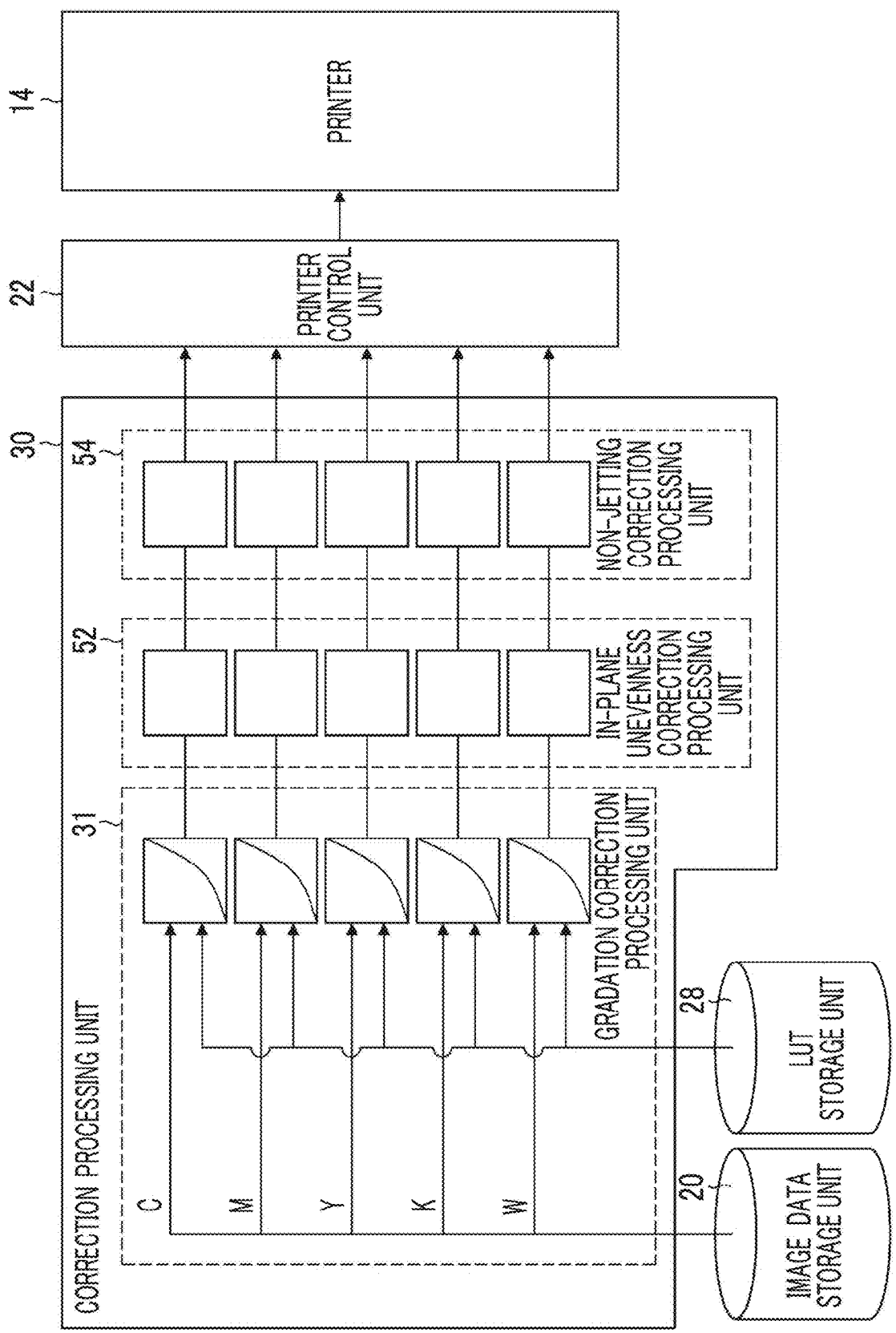
FIG. 2 is a functional block diagram of a correction processing unit shown in FIG. 1.

FIG. 2 is a functional block diagram of the correction processing unit shown in FIG. 1. A computer comprising one or more processors and one or more memories can be applied to the correction processing unit 30 shown in FIG. 2. The processor executes a program stored in the memory and executes various types of functions of the correction processing unit 30. A personal computer and so on may be cited as examples of the computer.

The correction processing unit 30 comprises the gradation correction processing unit 31, an in-plane unevenness correction processing unit 52, and a non-jetting correction processing unit 54. The gradation correction processing unit 31 reads out gradation correction chart data from the image data storage unit 20.

The gradation correction processing unit 31 decomposes gradation correction chart data into gradation correction chart data for each of colors including cyan, magenta, yellow, black, and white. The gradation correction processing unit 31 corrects, with respect to gradation correction chart data for each color, a gradation value for each color with reference to a gradation correction LUT for each color stored in the LUT storage unit 28. In FIG. 2, a gradation correction LUT corresponding to a tone curve indicating a relationship between a gradation value and a density value is given as an example.

The in-plane unevenness correction processing unit 52 corrects in-plane unevenness in a patch configuring a gradation correction chart. Specifically, the in-plane unevenness correction processing unit 52 corrects a jetting amount for each nozzle according to jetting characteristics for each nozzle of the ink jet head provided in the printer 14 shown in FIG. 1.

The non-jetting correction processing unit 54 corrects a non-jetting nozzle. Specifically, the non-jetting correction processing unit 54 masks the non-jetting nozzle and executes alternative jetting of the non-jetting nozzle using a nozzle close to the non-jetting nozzle.

Attributable to execution of in-plane unevenness correction and non-jetting nozzle correction, the printer 14 can print a gradation correction chart including a patch in which in-plane unevenness is suppressed and streak unevenness attributable to the non-jetting nozzle is suppressed.

Gradation correction chart data corrected using the correction processing unit 30 is transmitted to the printer control unit 22. The printer control unit 22 generates a jetting control signal based on the received gradation correction chart data and transmits the jetting control signal to the printer 14. The printer 14 prints a gradation correction chart based on the jetting control signal.

[Procedures of Gradation Correction LUT Generation Method]

Figure 3:
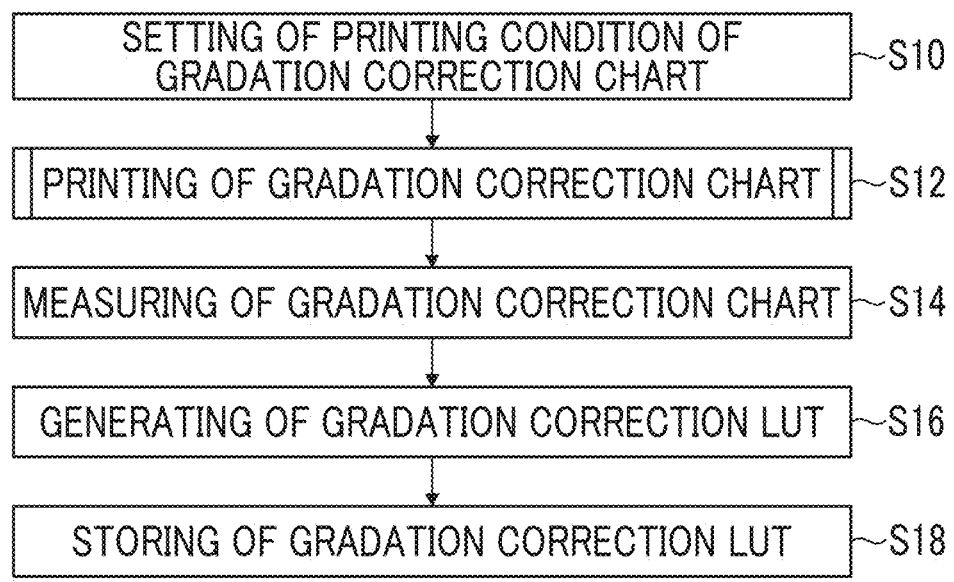
FIG. 3 is a flowchart showing procedures of a gradation correction LUT generation method.

FIG. 3 is a flowchart showing procedures of a gradation correction LUT generation method. In a printing condition setting step S10, the printer control unit 22 shown in FIG. 1 sets printing conditions of a gradation correction chart with respect to the printer 14. Examples of the printing conditions include an ink type and a substrate type.

In a gradation correction chart printing step S12, the printer control unit 22 prints the gradation correction chart based on gradation correction chart data on which various types of correction processes, such as a gradation correction process, are executed.

The gradation correction chart printing step S12 includes a plurality of steps to be described later. Each of the steps configuring the gradation correction chart printing step S12 configures a chart method applied to the chart manufacturing apparatus. Details of the gradation correction chart printing step S12 will be described later.

In a gradation correction chart measuring step S14, the gradation correction chart printed in the gradation correction chart printing step S12 is measured by applying the measuring instrument 12 shown in FIG. 1. For measurement of the gradation correction chart, automatic measurement may be applied, or manual measurement may be applied.

In automatic measurement, between the printer 14 and the measuring instrument 12, a substrate on which the gradation correction chart output from the printer 14 is printed is transported to the measuring instrument 12, the substrate is set at the measuring instrument 12, and the gradation correction chart is measured.

In manual measurement, the substrate on which the gradation correction chart output from the printer 14 is printed is manually set at the measuring instrument 12, and the gradation correction chart is measured.

In a gradation correction LUT generating step S16, the gradation correction LUT generation unit 26 acquires measurement data of the gradation correction chart from the measuring instrument 12 and generates a gradation correction LUT based on the acquired measurement data of the gradation correction chart.

Specifically, in the gradation correction LUT generating step S16, the gradation correction LUT generation unit 26 generates the gradation correction LUT for correcting a correspondence relationship between a gradation value and a density value. An example of the tone curve in which a relationship between a gradation value and a density value for each color is corrected is shown in FIG. 2.

Figure 4:
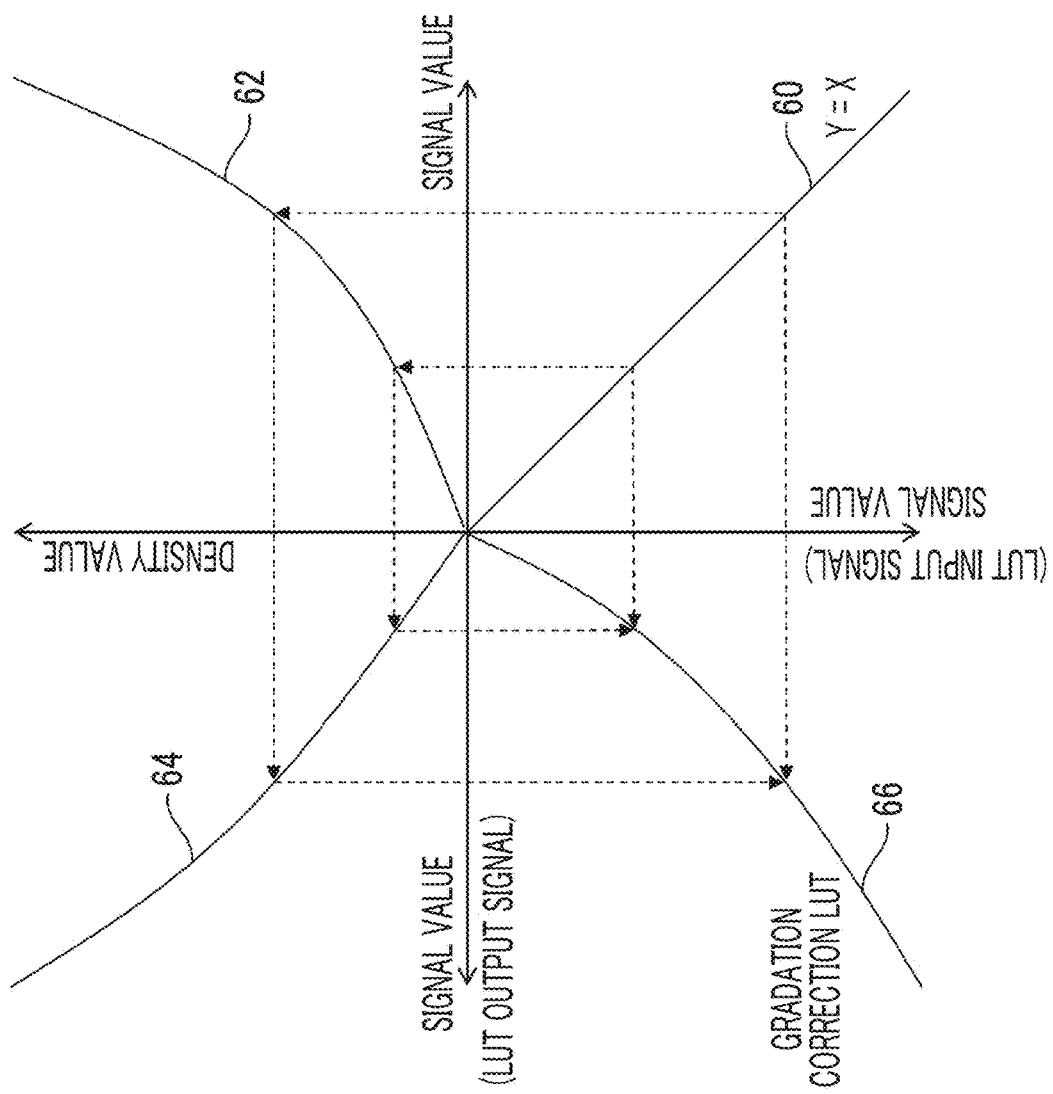
FIG. 4 is a schematic diagram of a gradation correction LUT generating step.

FIG. 4 is a schematic diagram of the gradation correction LUT generating step. FIG. 4 shows processing of each step in the gradation correction LUT generating step S16 using schematic diagrams of four types of graph formats. Herein, an aspect of correcting the existing gradation correction LUT will be described.

A straight line 60 shows a relationship between an input signal value and an output signal value of the existing gradation correction LUT. In the existing gradation correction LUT, the input signal value and the output signal value are the same value. In a case where the input signal value is set as X and the output signal value is set as Y, the output signal value Y is represented as Y=X. The existing gradation correction LUT herein means a gradation correction LUT applied to printing of a gradation correction chart.

A curve 62 schematically shows a relationship between a signal value and a target density value applied to printing of each patch of a gradation correction chart. The target density value corresponds to a density value of the curve 62. A table indicating a relationship between a signal value and a target density value applied to printing of each patch of a gradation correction chart is stored in the image data storage unit 20 shown in FIG. 1 or the like.

A curve 64 schematically shows a relationship between a signal value and measurement data of each patch acquired in the gradation correction chart measuring step S14, which is applied to printing of each patch of a gradation correction chart. The measurement data of each patch corresponds to a density value of the curve 64.

The measurement data of each patch of a gradation correction chart ideally matches a target density value, but the measurement data of each patch is different from the target density value due to variations of jetting characteristics of the ink jet head or the like.

A curve 66 schematically shows a gradation correction LUT in which a signal value for reproducing a target density value is set as an output signal value and a gradation value derived based on image data is set as an input signal value.

The gradation correction LUT is generated by applying the following steps. First, from the table indicating a relationship between a signal value and a target density value applied to printing of each patch of a gradation correction chart, which is represented as the curve 62, a signal value associated with a target density value is derived.

Next, a signal value for reproducing a target density value is derived using a relationship between a signal value and measurement data of each patch applied to printing of each patch of a gradation correction chart, which is represented as the curve 64. The signal value for reproducing a target density value derived from the curve 64 is assigned to an input signal value applied to a target density value.

Accordingly, a relationship between a signal value before correction which is already assigned to each patch and a signal value after correction for reproducing a target density value is derived, and a gradation correction LUT in which the signal value before correction is set as an input and the signal value after correction is set as an output is generated.

In a gradation correction LUT storing step S18, the gradation correction LUT generation unit 26 stores the gradation correction LUT in the LUT storage unit 28. The printer 14 reads out the gradation correction LUT stored in the LUT storage unit 28 and applies the gradation correction LUT to processing of image data.

[Density Management of White Image]

An example of a white image printed using a white ink includes a base of a color image printed on a transparent substrate. It is important that the white image applied to the base of the color image is not transparent. In general, a degree of transparency of the white image can be applied with a covering ratio as an evaluation indicator. The covering ratio is calculated by measuring each of density values of a plurality of white patches having different signal values indicating gradation values with a white background and a black background applied and applying a calculation method defined in the standards.

For example, for a white patch, a covering ratio can be calculated by applying a method B specified in JIS K 5600-4-1 covering force of Japanese Industrial Standards. JIS K 5600-4-1 covering force is a Japanese Industrial Standard created by translating ISO/FDIS 6504-3 issued in 1998 without changing technical content and a format of a standard form. JIS is an abbreviation of Japanese Industrial Standards. ISO is an abbreviation of International Organization for Standardization.

The color white of a white image and a white ink includes, in general, white recognized as white in a broad sense without being limited to white that reflects all wavelengths of visible light rays 100 percent in a strict sense. The white ink represents a white ink and an ink sold under a name such as a white ink. An example of the white ink includes an ink containing a white pigment such as titanium oxide particles. White is synonymous with the color of white, and these can be interchanged with each other.

In the present embodiment, a white patch is measured using two types of backgrounds having colors different from each other, a gradation correction LUT is created by associating a signal value applied in a case of printing the white patch and a covering ratio for managing a white ink with each other, and the density of the white ink can be directly managed using the signal value applied in printing.

[Specific Example of Gradation Correction Chart]

Figure 5:
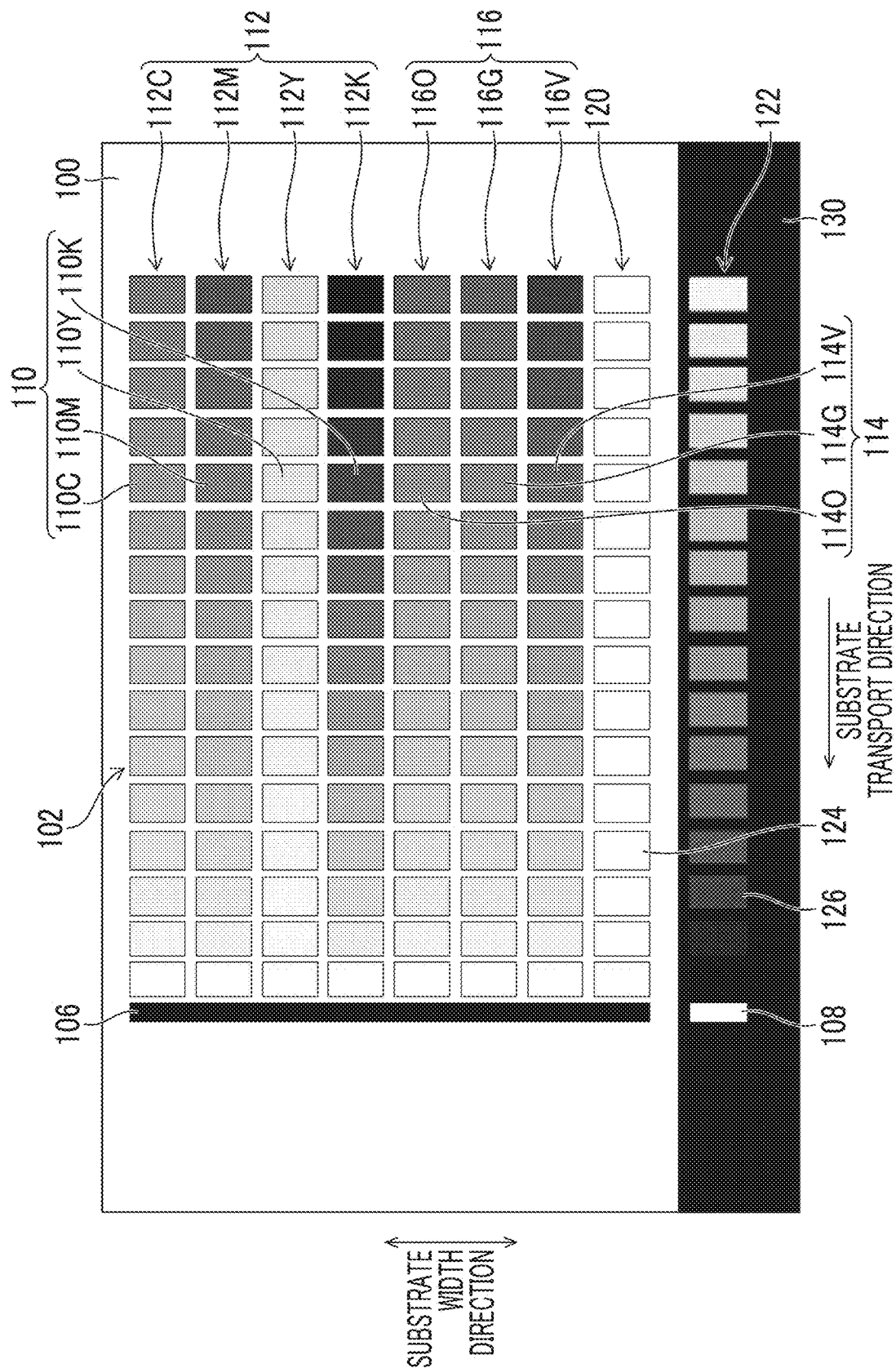
FIG. 5 is an explanatory diagram of a gradation correction chart.

FIG. 5 is an explanatory diagram of a gradation correction chart. FIG. 5 shows a gradation correction chart 102 printed on a substrate 100. The substrate 100 is a transparent sheet-like medium, and an impermeable medium is applied. Examples of a material for the substrate 100 include oriented nylon (ONY), oriented polypropylene (OPP), and polyethylene terephthalate (PET).

Being impermeable means having impermeability with respect to a water-based ink to be described below. Being transparent means having a visible light transmittance equal to or higher than 30% and equal to or lower than 100% and preferably a visible light transmittance equal to or higher than 70% and equal to or lower than 100%.

The gradation correction chart 102 includes a process color patch group 112 in which a plurality of patches 110 printed using a process color ink are components. The process color patch group 112 includes a cyan patch group 112C, a magenta patch group 112M, a yellow patch group 112Y, and a black patch group 112K.

The cyan patch group 112C has a plurality of cyan patches 110C as components. The magenta patch group 112M has a plurality of magenta patches 110M as components. The yellow patch group 112Y has a plurality of yellow patches 110Y as components. The black patch group 112K has a plurality of black patches 110K as components.

The gradation correction chart 102 includes a special color patch group 116 having a plurality of special color patches 114 printed using a special color ink as components. The special color patch group 116 includes an orange patch group 116O, a green patch group 116G, and a violet patch group 116V.

The orange patch group 116O has a plurality of orange patches 114O as components. The green patch group 116G has a plurality of green patches 114G as components. The violet patch group 116V has a plurality of violet patches 114V as components.

The gradation correction chart 102 includes a first white patch group 120 and a second white patch group 122. The first white patch group 120 includes a plurality of first white patches 124. The second white patch group 122 includes a plurality of second white patches 126.

Gradation values of the plurality of first white patches 124 configuring the first white patch group 120 increase from a downstream side toward an upstream side in a substrate transport direction. A minimum gradation value is applied to the first white patch 124 that is at an end on the downstream side in the substrate transport direction. In addition, a maximum gradation value is applied to the first white patch 124 that is at an end on the upstream side in the substrate transport direction.

The first white patch group 120 shown in FIG. 5 is configured by 16 first white patches 124. For example, in a case where the gradation value is represented by a numerical value from 0 to 255, gradation values of the 16 first white patches 124 have a minimum gradation value of 0 and a maximum gradation value of 255, and the gradation value is increased by 17.

The same gradation values as the second white patches 126 are applied to the plurality of first white patches 124 configuring the second white patch group 122. That is, the same gradation value is applied to the first white patch 124 and the second white patch 126 that have the same position in the substrate transport direction.

The first white patch group 120 and the second white patch group 122 are disposed at positions different from each other in a substrate width direction orthogonal to the substrate transport direction. Being orthogonal herein means that an angle formed by the two directions is smaller than 90 degrees or larger than 90 degrees, but can include being substantially orthogonal through which the same operational effects as in the case where the angle formed by the two directions is 90 degrees are obtained.

The same gradation value as the first white patch group 120 is applied to the process color patch group 112 and the special color patch group 116. The process color patch group 112 and the special color patch group 116 are disposed at positions different from each other in the substrate width direction.

Patch groups of respective colors configuring the process color patch group 112 are disposed at positions different from each other in the substrate width direction. In addition, patch groups of respective colors configuring the special color patch group 116 are disposed at positions different from each other in the substrate width direction.

In the gradation correction chart 102, patches of respective colors are disposed along a substrate transport direction in order of a gradation value, and patches of different colors disposed along the substrate width direction have the same gradation value. Being the same herein is not limited to being the same in a strict sense and can include being substantially the same.

A first measurement start position mark 106 and a second measurement start position mark 108 are printed in the gradation correction chart 102. The first measurement start position mark 106 is printed using a black ink. The second measurement start position mark 108 is printed using a white ink.

The first measurement start position mark 106 indicates measurement start positions of the process color patch group 112, the special color patches 114, and the first white patch group 120 in the gradation correction chart 102. The second measurement start position mark 108 indicates a measurement start position of the second white patch group 122.

In the gradation correction chart 102, a black measurement background image 130 is printed using a black ink. The black measurement background image 130 is disposed at a region where the second white patch group 122 is printed, that is a region where the process color patch group 112 and the special color patch group 116 not printed. An example of a black ink includes an ink containing carbon black particles. Details of the black measurement background image 130 will be described later.

The black measurement background image 130 described in the embodiment is an example of a first measurement background image. The second white patch 126 described in the embodiment is an example of a first patch. The second white patch group 122 described in the embodiment is an example of a first patch group including one or more first patches. The first white patch 124 described in the embodiment is an example of a second patch. The first white patch group 120 described in the embodiment is an example of a second patch group including one or more second patches.

In addition, the patches 110 configuring the process color patch group 112 described in the embodiment and the patches 110 configuring the special color patch group 116 are another examples of the second patch. The process color patch group 112 and the special color patch group 116 described in the embodiment are another examples of the second patch group. A white ink configuring the second white patch 126 described in the embodiment is an example of a coloring material of a first color.

Printing of the first white patch 124 described in the embodiment is an example of forming one or more second patches. Printing of the patches 110 configuring the process color patch group 112 and the patches 110 configuring the special color patch group 116 described in the embodiment is an example of forming one or more patches included in the second patch group. The process color and the special color described in the embodiment is an example of a second color.

[Configuration Example of Background Applied to Measurement of Gradation Correction Chart]

Figure 6:
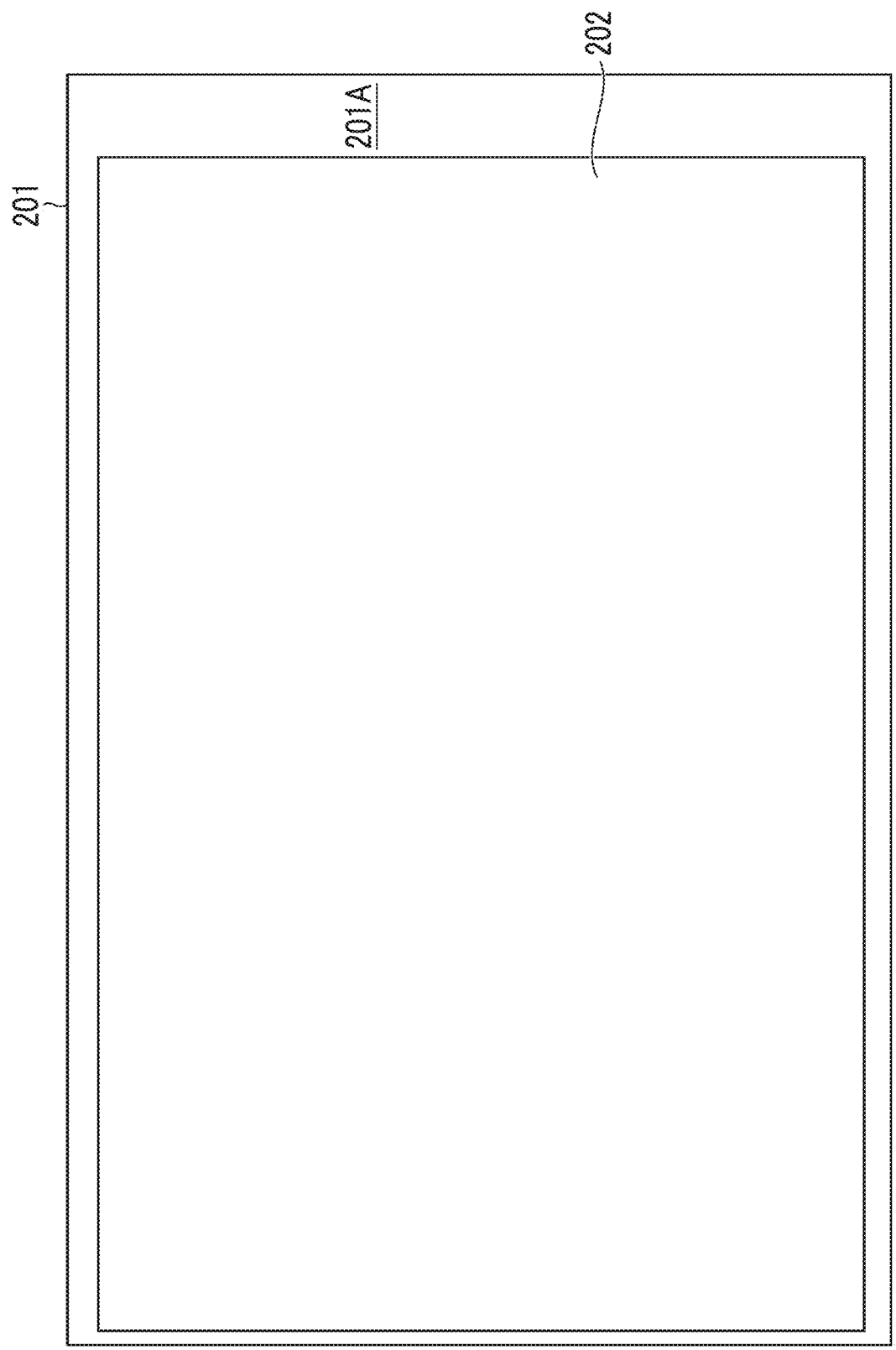
FIG. 6 is a plan view of a background indicating a configuration example of a background.

FIG. 6 is a plan view of a background indicating a configuration example of a background. A white background 202 shown in FIG. 6 is applied to the measuring instrument 12 shown in FIG. 1. In a case where the gradation correction chart 102 printed on the substrate 100 shown in FIG. 5 is measured, the substrate 100 is supported using a stage 201.

The white background 202 is formed on a substrate support surface 201A of the stage 201, which supports the substrate 100. For example, bonding of a sheet, on which the white background 202 is printed, to the substrate support surface 201A can be applied to formation of the white background 202 on the substrate support surface 201A. Surface treatment such as coating may be applied to formation of the white background 202 on the substrate support surface 201A.

[Measurement of Gradation Correction Chart and Calculation of Gradation Correction Data]

Figure 7:
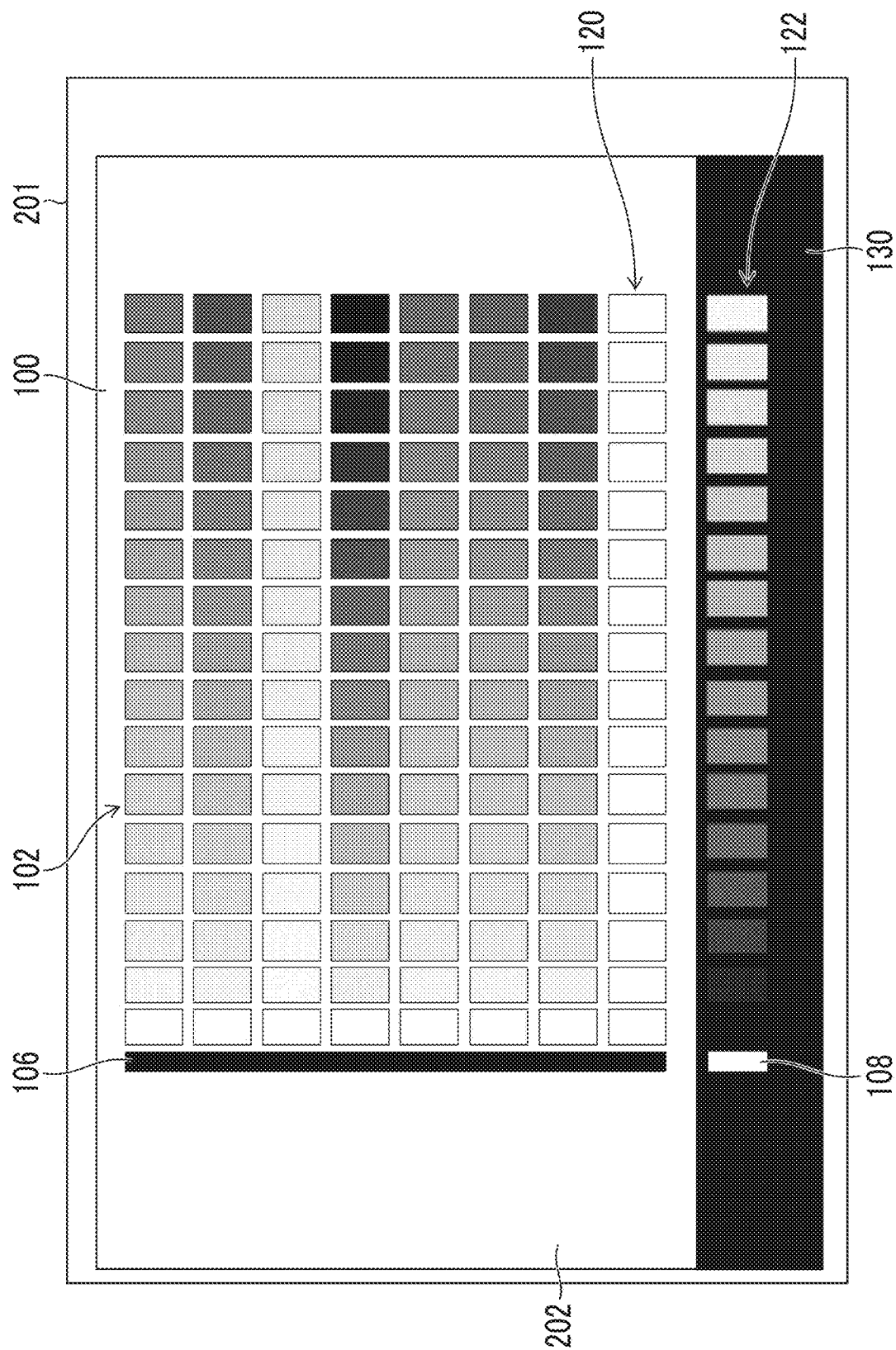
FIG. 7 is a schematic diagram of the gradation correction chart in a measurement state.

FIG. 7 is a schematic diagram of a gradation correction chart in a measurement state. Showing of some reference numerals of reference numerals shown in FIG. 5 is omitted in FIG. 7. The same applies to FIGS. 17 and 18. As shown in FIG. 7, the gradation correction chart 102 is registered with respect to the white background 202, and the gradation correction chart 102 is measured.

Specifically, a Y-value of a CIEXYZ color system is acquired for each of the plurality of first white patches 124 configuring the first white patch group 120. Similarly, a Y-value of the CIEXYZ color system is acquired for each of the plurality of second white patches 126 configuring the second white patch group 122.

A measured value of the first white patch 124 is affected by the density of the white background 202. Similarly, a measured value of the second white patch 126 is affected by the density of the black measurement background image 130. For the purpose of avoiding the effect of the white background 202 on the measured value of the first white patch 124 and the effect of the black measurement background image 130 on the second white patch 126, the measured value of the first white patch 124 and the measured value of the second white patch 126 are normalized using the density value of the white background 202 and the density value of the black measurement background image 130.

In a case where a Y-value of the observation light source is set as $Y_L$, a Y-value of the black measurement background image 130 is set as $Y_{bk}$, and a measured value acquired as a background of the black measurement background image 130 is set as $Y_{mk}$, a standardized Y-value $Y_{nb}$ is represented as $Y_{nb}=(Y_{mk}-Y_{bk})/(Y_L-Y_{bk})$. In other words, a measured value $Y_{mb}$, which is an absolute value, is converted into the Y-value $Y_{nb}$, which is a relative value with the black measurement background image 130 as reference.

In a case where the white background 202 is used, a Y-value of the white background 202 is set as $Y_{wh}$, a measured value acquired as a background of the white background 202 is set as $Y_{mw}$, and a standardized Y-value $Y_{nw}$ is represented as $Y_{nw}=(Y_{mw}-Y_{wh})/(Y_L-Y_{wh})$. A Y-value obtained by measuring a region of the substrate 100 where the gradation correction chart 102 is not formed can be applied to the Y-value $Y_{wh}$ of the white background 202. The same applies to a Y-value $Y_{bk}$ of the black measurement background image 130.

A covering ratio $Y_{nb}/Y_{nw}$ for each gradation value in a white ink is calculated using the Y-value $Y_{nw}$ based on measurement data of the first white patch 124 and the Y-value $Y_{nb}$ based on measurement data of the second white patch 126.

A target covering ratio for each gradation value in a white ink is acquired, a target covering ratio indicating a target white ink density and a covering ratio calculated from measurement data of each patch are compared with each other, and a difference of a covering ratio calculated with respect to the target covering ratio is calculated. A gradation correction LUT applied to the white ink is generated based on the calculated difference of the covering ratio.

Specifically, along the procedures of the gradation correction LUT generating step S16 of FIG. 3 described with reference to FIG. 4, a density value is replaced with a covering ratio, and a gradation correction LUT applied to a white ink is generated. The gradation correction LUT is stored in the LUT storage unit 28 shown in FIG. 1.

The gradation correction LUT applied to a white ink indicates a relationship between a signal value indicating a gradation value and a covering ratio which is an evaluation indicator value of a white patch. For the white ink, a signal value for realizing a target covering ratio is derived, and printing in which a target density value is reproduced is possible. In addition, the density value of the white ink corresponding to the target covering ratio in a case where the density value is changed can also be adjusted.

For example, in printing of a white image in which the covering ratio of the white ink is set to 53 percent, for the purpose of suppressing an increase in costs of the white ink or the like, in a case where a white covering ratio is changed to 51 percent, a signal value indicating a gradation value in which the covering ratio is 51 percent can be acquired with reference to a white gradation correction LUT.

In this manner, in a case where the covering ratio of the white ink is changed, a signal value indicating a gradation value corresponding to the changed covering ratio of the white ink may not be derived based on printing and measurement of the gradation correction chart 102.

As for a process color ink such as cyan and a special color ink such as orange, an LUT for each color stored in the LUT storage unit 28 shown in FIG. 1 is corrected based on the Y-value of the CIEXYZ color system of each patch 110 for each color acquired in measurement of the gradation correction chart 102.

Also for a process ink other than white, such as cyan, in correction of an LUT, a Y-value $Y_n$ normalized using a Y-value $Y_L$ of an observation light source and a Y-value $Y_{wh}$ of the white background 202 is applied. Standardization of a measured value using the density of the white background 202 is not limited to the example. Insofar as a measured value of an absolute value can be converted into a relative value with a background color as reference, methods other than the above can be applied.

In a case where the measured value of the absolute value is converted into the relative value, the correction accuracy of the LUT can be improved as a density contrast between the patch 110 and the white background 202 relatively increases. Thus, the density of the white background 202 is measured, and in a case where the measured density value is equal to or smaller than a specific threshold value, an aspect in which a warning is issued is preferable.

An example of the warning includes an aspect in which character information indicating content of a warning is displayed on the display device 16 shown in FIG. 1 and a user is prompted to replace the white background 202 or the like. A Y-value obtained by measuring a region of the substrate 100 where the gradation correction chart 102 is not formed can be applied to the Y-value of the white background 202.

In a case where printing using a single-pass method is applied to the printer 14, a direction in which the plurality of patches 110 of the same color are disposed is preferably a direction parallel to the substrate transport direction. In a case where the plurality of patches 110 of the same color are disposed to be parallel to the substrate transport direction, in-plane density uniformity in each patch 110 can relatively improve, and the correction accuracy of an LUT can relatively improve. Being parallel herein means intersecting in a strict sense, but can include substantially being parallel through which the same operational effects as being parallel are obtained.

In measurement of the gradation correction chart 102, in a case where in-plane density uniformity in the white background 202 is relatively high, the correction accuracy of an LUT can relatively improve. Thus, in-plane density unevenness in the white background 202 is measured, and in a case where the measured density unevenness is equal to or greater than a specific threshold value, an aspect in which a warning is issued is preferable. The aspect given as an example above can be applied to the warning. A user who has visually recognized the warning performs replacement, cleaning, and the like of the white background 202, and in-plane density unevenness in the white background 202 can be suppressed.

[Drive Voltage Applied to Printing of Gradation Correction Chart]

Figure 8:
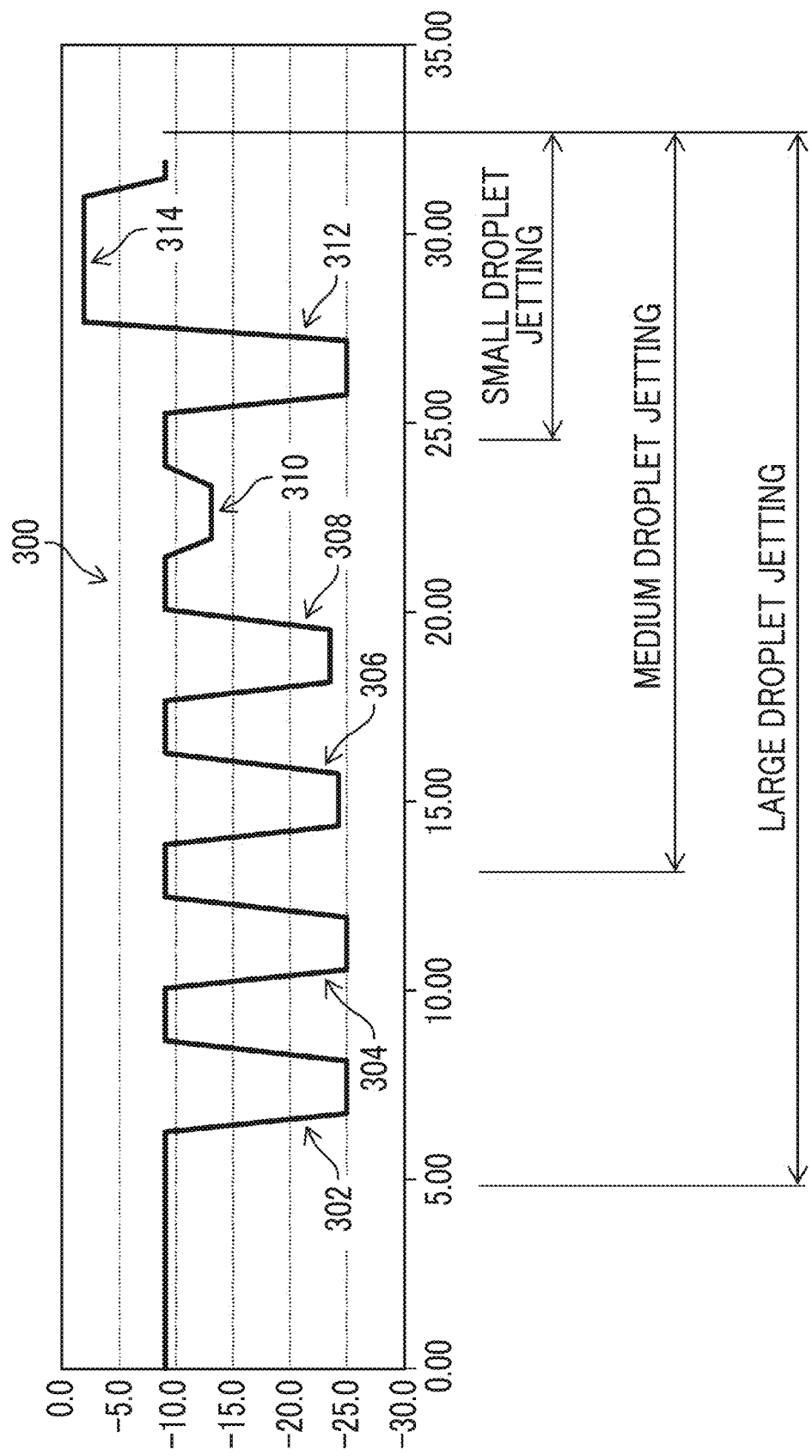
FIG. 8 is an explanatory diagram of a drive voltage applied to printing of the gradation correction chart.

FIG. 8 is an explanatory diagram of a drive voltage applied to printing of a gradation correction chart. FIG. 8 shows one jetting cycle of the drive voltage supplied to an ink jet head using a piezoelectric jetting method provided with the printer 14 shown in FIG. 1 with a graph format applied.

The horizontal axis of the graph shown in FIG. 8 represents time, and the unit of the horizontal axis is microseconds. The vertical axis of the graph shown in FIG. 8 represents a voltage, and the unit of the vertical axis is volts. Numerical values shown in FIG. 8 are examples and can be specified as appropriate according to printing conditions and the standards of a piezoelectric element provided in the ink jet head.

A continuous jetting drive method is applied to the ink jet head, and among a plurality of jetting drive pulses configuring a drive waveform 300 shown in FIG. 8, one or more jetting drive pulses according to a jetting volume are supplied. Accordingly, the ink jet head can eject large droplets, medium droplets, and small droplets having volumes different from each other.

For example, in a case where small droplets are jetted, a jetting drive pulse 312 is applied. In a case where medium droplets are jetted, a jetting drive pulse 306, a jetting drive pulse 308, a jetting drive pulse 310, and the jetting drive pulse 312 are applied.

In a case where large droplets are jetted, a jetting drive pulse 302, a jetting drive pulse 304, the jetting drive pulse 306, the jetting drive pulse 308, the jetting drive pulse 310, and the jetting drive pulse 312 are applied.

A drive waveform element subsequent to the jetting drive pulse 312 is a reverberation suppression waveform element 314. The reverberation suppression waveform element 314 can be added in all cases of large droplets, medium droplets, and small droplets for the purpose of suppressing vibration of an ink immediately after jetting ink droplets.

The same printing conditions as normal printing are applied to printing of the gradation correction chart 102 shown in FIG. 5. That is, among patches configuring patch groups configuring the gradation correction chart 102, one or more patches for each color are printed by combining a plurality of sizes of dots.

For example, only small dots corresponding to small droplets are applied to the patch 110 having a relatively small gradation value, and small dots and medium dots corresponding to medium droplets are applied to the patch 110 having a relatively small gradation value.

[Configuration Example of Ink Jet Printing System According to Embodiment]

Figure 9:
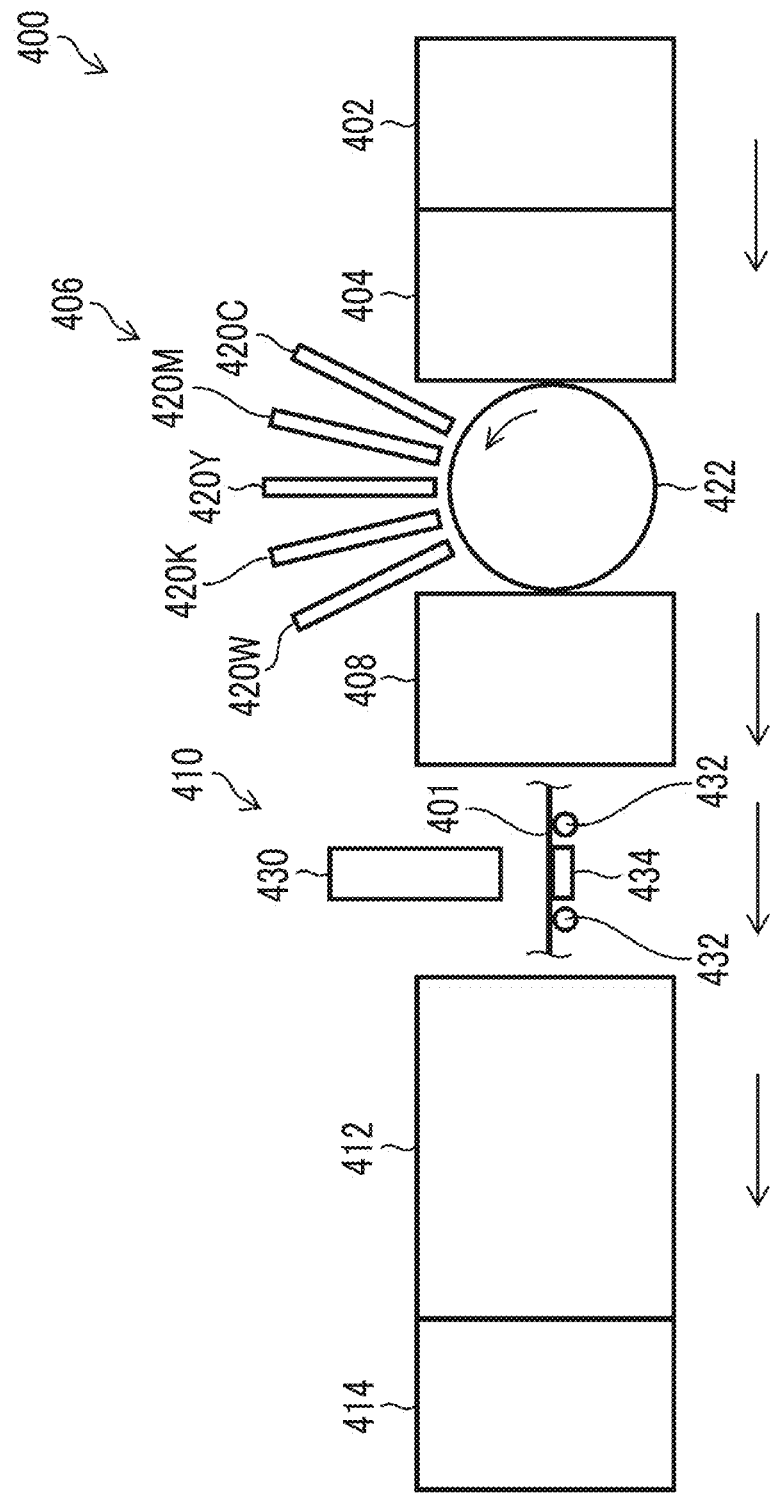
FIG. 9 is an overall configuration diagram of an ink jet printing system according to an embodiment.

FIG. 9 is an overall configuration diagram of an ink jet printing system according to the embodiment. An ink jet printing system 400 is provided with a printing device 406 using a digital method that prints a color image on a transparent substrate 401 by applying printing using the single-pass method.

In the present embodiment, soft packaging such as a plastic film is given as an example of the substrate 401. The substrate 401 may be a single layer, or a plurality of layers may be superimposed on each other. The substrate 401 may be in a roll-to-roll continuous form or may be in a single-wafer form cut to a specific length. In addition, the substrate 401 is referred to as a medium, media, a sheet, a film, a substrate, or the like in some cases. The substrate 401 shown in FIG. 9 corresponds to the substrate 100 shown in FIG. 5.

The ink jet printing system 400 comprises a substrate supply device 402, a first intermediate transport device 404, the printing device 406, a second intermediate transport device 408, a measuring device 410, a drying device 412, and an accumulation device 414.

Hereinafter, each unit will be described in detail.

[Substrate Supply Device]

In a case where the substrate 401 is in a continuous form, the substrate supply device 402 comprises a roll housing part that houses a roll around which the substrate 401 is wound. In a case where the substrate 401 is in a single-wafer form, the substrate supply device 402 comprises a tray in which the substrate 401 is housed. The substrate supply device 402 supplies the substrate 401 to the first intermediate transport device 404 in response to printing control of the printing device 406. The substrate supply device 402 can comprise a correction mechanism that corrects the posture of the substrate 401.

[First Intermediate Transport Device]

The first intermediate transport device 404 transfers the substrate 401 supplied from the substrate supply device 402 to the printing device 406. A known configuration according to the form of the substrate 401 can be applied to the first intermediate transport device 404. In addition, an arrow line from the substrate supply device 402 toward the first intermediate transport device 404 indicates the substrate transport direction.

[Printing Device]

The printing device 406 comprises an ink jet head 420C, an ink jet head 420M, an ink jet head 420Y, an ink jet head 420K, and an ink jet head 420W.

The ink jet head 420C, the ink jet head 420M, the ink jet head 420Y, the ink jet head 420K, and the ink jet head 420W are disposed in the order described above from the upstream side along the substrate transport direction.

The ink jet head 420C jets a cyan ink. The ink jet head 420M jets a magenta ink. The ink jet head 420Y jets a yellow ink. The ink jet head 420K jets a black ink. The ink jet head 420W jets a white ink.

A line head in which a plurality of nozzles are disposed in the substrate width direction over a length equal to or larger than the total length of the substrate 401 can be applied to the ink jet head 420C or the like. Two dimensional disposition such as matrix disposition is applied to the plurality of nozzles provided in the ink jet head 420C or the like.

A piezoelectric jetting method comprising a piezoelectric element that is a jetting pressure element which generates a jetting pressure can be applied to the ink jet head 420C or the like. A thermal method of jetting an ink by using a film boiling phenomenon of the ink can be applied to the ink jet head 420C or the like.

The printing device 406 forms a color image on the transparent substrate 401 using a color ink such as a cyan ink and forms a white image that is a background image on white the color image is superimposed using a white ink. As a printed material generated using the substrate 401, the color image can be visually recognized in a case where the substrate 401 is viewed from a non-printed surface.

The printing device 406 comprises a printing drum 422. The printing drum 422 has a cylindrical shape. The printing drum 422 comprises, on a peripheral surface thereof, a substrate support region that supports the substrate 401. The substrate support region is not shown.

A rotation shaft of the printing drum 422 is connected to a motor (not shown) via a drive mechanism (not shown). In a case where the motor is rotated, the printing drum 422 is rotated in a direction indicated by an arrow line. In a case where the printing drum 422 is rotated, the substrate 401 supported by the peripheral surface of the printing drum 422 is transported along a rotation direction of the printing drum 422.

A plurality of suction holes are formed in the substrate support region. The plurality of suction holes are disposed based on a specific pattern. The plurality of suction holes communicate with a suction flow passage (not shown). The suction flow passage is connected to a suction pump (not shown). By operating the suction pump to generate a negative pressure in the plurality of suction holes, the substrate 401 is suction-supported by the peripheral surface of the printing drum 422.

A transport form of the substrate 401 in the printing device 406 is not limited to a transport form using the printing drum 422. For example, a transport form using a transport belt, a transport form using a plurality of rollers, and the like can be applied.

[Second Intermediate Transport Device]

The second intermediate transport device 408 transfers the substrate 401 transferred from the printing drum 422 to the measuring device 410. The same configuration as the first intermediate transport device 404 can be applied to the second intermediate transport device 408.

An arrow line shown in the second intermediate transport device 408 indicates the substrate transport direction of the second intermediate transport device 408.

[Measuring Device]

The measuring device 410 comprises a density measuring instrument 430, a plurality of reading transport rollers 432, and a stage 434. The measuring device 410 comprises an illumination device. Showing of the illumination device is omitted in the drawings. The density measuring instrument 430 shown in FIG. 9 corresponds to the measuring instrument 12 shown in FIG. 1. The stage 434 shown in FIG. 9 corresponds to the stage 201 provided in the measuring instrument 12 shown in FIG. 1.

The density measuring instrument 430 shown in FIG. 9 can measure a gradation correction chart printed on the substrate 401, like the measuring instrument 12 shown in FIG. 1. The ink jet printing system 400 can generate gradation correction data for each color based on measurement data of the gradation correction chart and generate a gradation correction LUT for each color based on the gradation correction data for each color.

Although a roller transport method is given as an example of a transport method of the substrate 401 in the measuring device 410 in FIG. 9, other methods such as a belt transport method and a drum transport method can be applied to the transport method of the substrate 401 in the measuring device 410.

The measuring device 410 can comprise an imaging apparatus that images a test pattern printed on the substrate 401. The ink jet printing system 400 can detect a jetting abnormality of the ink jet head 420C or the like based on imaging data of the test pattern.

[Drying Device]

The drying device 412 performs a drying process on the printed substrate 401. The drying device 412 comprises a heater and a fan, and a configuration where hot air is blown onto the printed substrate 401 can be applied. The drying device 412 comprises a drying and transport unit that transports the printed substrate 401. As the transport form of the printed substrate 401, known transport forms such as drum transport, belt transport, and roller transport can be applied. An arrow line shown in the drying device 412 indicates the substrate transport direction of the drying device 412.

[Accumulation Device]

The accumulation device 414 houses the substrate 401 transferred from the drying device 412. In a case where the substrate 401 is in a continuous form, the accumulation device 414 comprises a roll housing part that houses a roll around which the substrate 401 is wound. In a case where the substrate 401 is in a single-wafer form, the accumulation device 414 comprises a tray in which the substrate 401 is housed.

[Electric Configuration of Ink Jet Printing System]

Figure 10:
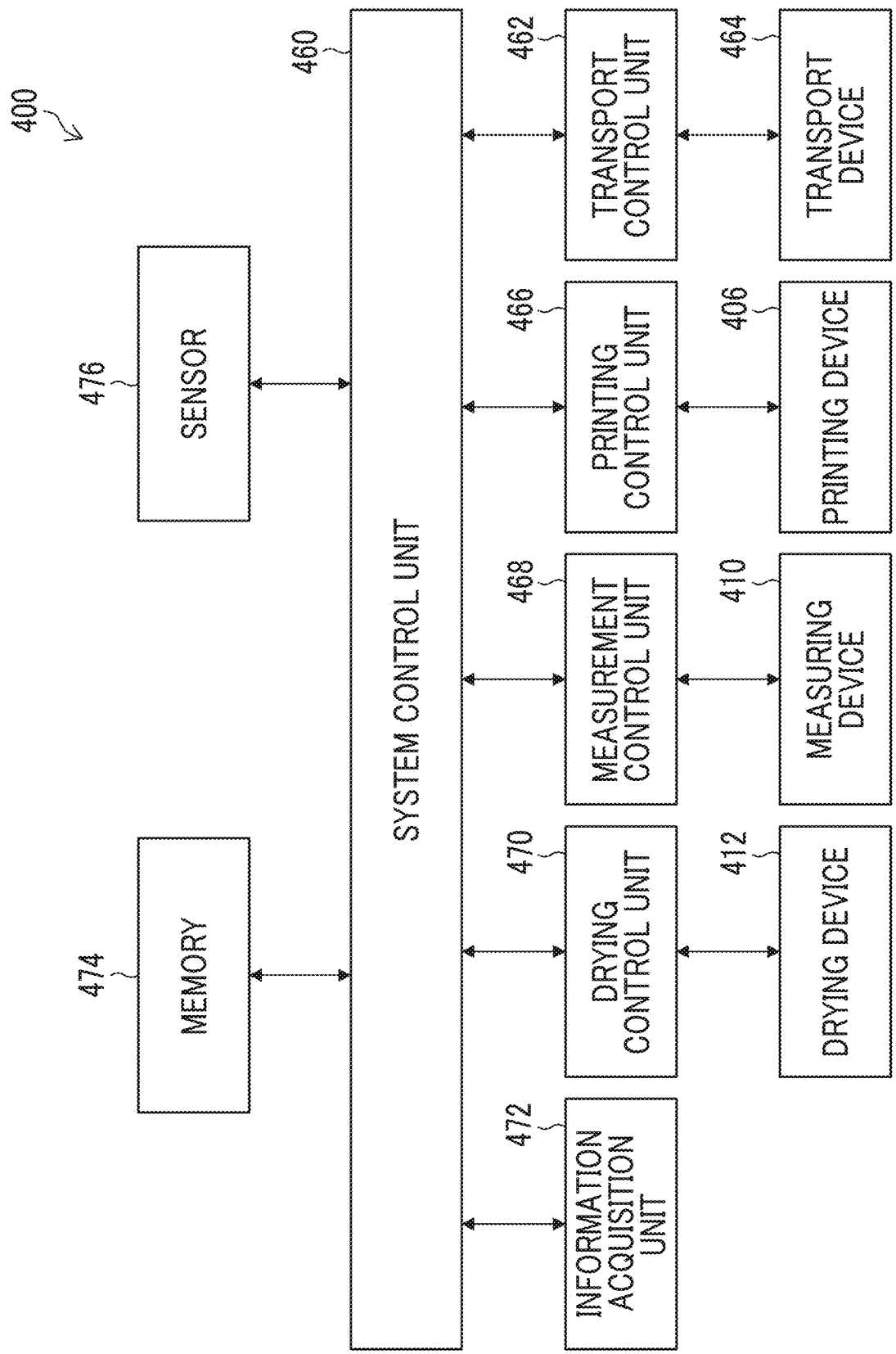
FIG. 10 is a functional block diagram showing an electric configuration of the ink jet printing system shown in FIG. 9.

FIG. 10 is a functional block diagram showing an electric configuration of the ink jet printing system shown in FIG. 9. The ink jet printing system 400 comprises a system control unit 460, a transport control unit 462, a printing control unit 466, a measurement control unit 468, a drying control unit 470, and an information acquisition unit 472.

The system control unit 460 comprehensively controls an overall operation of the ink jet printing system 400. The system control unit 460 transmits a command signal to various types of control units. The system control unit 460 functions as a memory controller that controls storing of data in a memory 474 and reading of the data from the memory 474.

The system control unit 460 acquires a sensor signal transmitted from a sensor 476 and transmits a command signal based on the sensor signal to various types of control units. The sensor 476 includes a position detection sensor and a temperature sensor provided in each unit of the ink jet printing system 400.

The transport control unit 462 sets transport conditions based on the command signal transmitted from the system control unit 460 and controls an operation of a transport device 464 based on the set transport conditions. The transport device 464 shown in FIG. 10 includes a drying and transport device provided in the first intermediate transport device 404, the printing drum 422, the reading transport roller 432, and the drying device 412 shown in FIG. 9. The transport device 464 may include the substrate supply device 402 and the accumulation device 414.

The printing control unit 466 sets printing conditions based on a command signal transmitted from the system control unit 460 and controls an operation of the printing device 406 based on the set printing conditions. The printing control unit 466 shown in FIG. 10 has a function of the printer control unit 22 shown in FIG. 1.

The printing control unit 466 comprises an image processing unit that executes a color decomposition process, a color conversion process, a correction process of each process, and a halftone process on printing image data to generate halftone data for each color.

The printing control unit 466 comprises a drive voltage generation unit that generates a drive voltage supplied to the ink jet head 420C or the like based on halftone data of each color. The printing control unit 466 comprises a drive voltage output unit that supplies a drive voltage to the ink jet head 420C.

The printing control unit 466 can print a gradation correction chart including cyan, magenta, yellow, black, and white patch groups based on gradation correction chart data, using the ink jet head 420C shown in FIG. 9 or the like.

The printing control unit 466 generates a multi-valued halftone image in a case where a halftone image of a gradation correction chart is generated and prints a gradation correction chart based on the multi-valued halftone image by combining a plurality of types of dots having sizes different from each other.

In a case where a gradation correction chart is printed, the printing control unit 466 causes a plurality of patches configuring a patch group of each color to be disposed along the substrate transport direction.

The printing control unit 466 can have functions of the gradation correction LUT generation unit 26 and the correction processing unit 30 shown in FIG. 1. The ink jet printing system 400 shown in FIG. 10 can comprise a gradation correction data generation unit that has the same function as the gradation correction data generation apparatus 10 shown in FIG. 1, in addition to the printing control unit 466.

In the printing control unit 466 shown in FIG. 10, a processing unit corresponding to the gradation correction data generation apparatus 10 shown in FIG. 1 acquires measurement data of a gradation correction chart from the measurement control unit 468 and generates a gradation correction LUT based on the measurement data of the gradation correction chart.

The measurement control unit 468 sets measurement conditions based on a command signal transmitted from the system control unit 460 and controls an operation of the measuring device 410 based on the set measurement conditions. The measurement control unit 468 shown in FIG. 10 can have a function of the measuring instrument control unit 24 shown in FIG. 1.

In a case where a density value of a background formed at the stage 434 is equal to or smaller than a specific threshold value, the measurement control unit 468 can issue a warning. In addition, in a case where in-plane density unevenness of the background formed at the stage 434 is equal to or greater than a specific threshold value, the measurement control unit 468 can issue a warning.

The drying control unit 470 sets processing conditions of a main drying process based on a command signal transmitted from the system control unit 460 and controls an operation of the drying device 412 based on the set processing conditions.

The information acquisition unit 472 acquires various types of information applied to control of the ink jet printing system 400. The system control unit 460 transmits a command signal to various types of control units based on the various types of information acquired using the information acquisition unit 472.

The memory 474 can store various types of data, parameters, and programs applied to the ink jet printing system 400. The memory 474 can function as the LUT storage unit 28 shown in FIG. 1.

Figure 11:
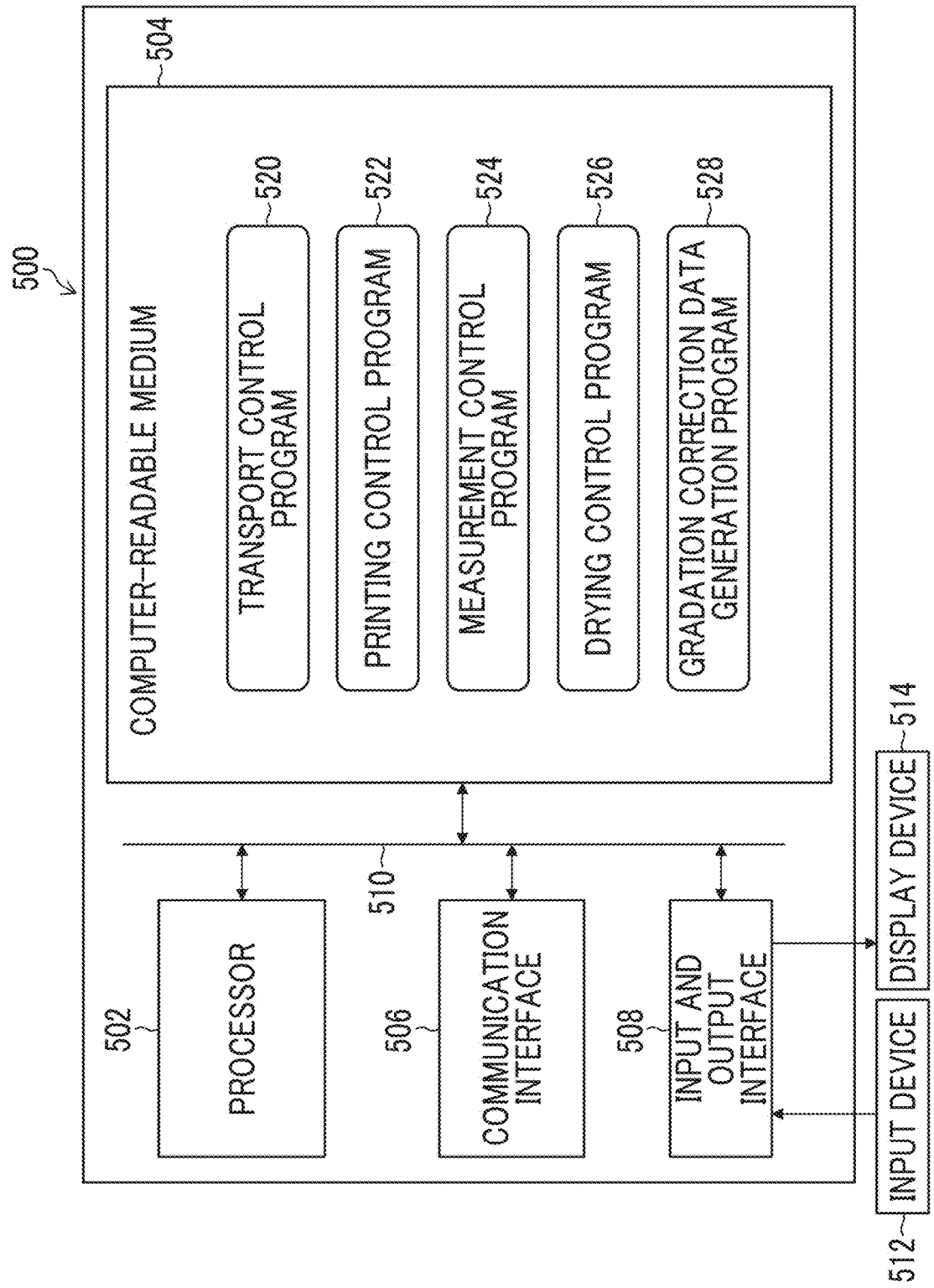
FIG. 11 is a block diagram showing a hardware configuration of a control device applied to the ink jet printing system shown in FIG. 9.

FIG. 11 is a block diagram showing a hardware configuration of a control device applied to the ink jet printing system shown in FIG. 9. A control device 500 provided in the ink jet printing system 400 comprises a processor 502, a computer-readable medium 504, which is a non-transitory tangible object, a communication interface 506, and an input and output interface 508.

A computer is applied to the control device 500. A form of the computer may be a server, may be a personal computer, may be a workstation, and may be a tablet terminal or the like.

The processor 502 includes a central processing unit (CPU). The processor 502 may include a graphics processing unit (GPU). The processor 502 is connected to the computer-readable medium 504, the communication interface 506, and the input and output interface 508 via a bus 510. An input device 512 and a display device 514 are connected to the bus 510 via the input and output interface 508.

The processor 502 functions as a first processor that executes a process related to generation of gradation correction data, a second processor that executes a process related to image formation, and a third processor that executes a process related to measurement.

The computer-readable medium 504 includes a memory which is a main memory and a storage which is an auxiliary memory. A semiconductor memory, a hard disk device, a solid state drive device, and the like can be applied to the computer-readable medium 504. Any combination of a plurality of devices can be applied to the computer-readable medium 504.

The hard disk device can be referred to as an HDD which is an abbreviation of a hard disk drive in English. The solid state drive device can be referred to as an SSD which is an abbreviation of a solid state drive in English.

The control device 500 is connected to a network via the communication interface 506 and is communicably connected to an external device. A local area network (LAN) or the like can be applied to the network. Showing of the network is omitted.

The computer-readable medium 504 stores a transport control program 520, a printing control program 522, a measurement control program 524, a drying control program 526, and a gradation correction data generation program 528.

The transport control program 520 corresponds to transport control applied to the transport device 464 shown in FIG. 10. The printing control program 522 corresponds to printing control applied to the printing device 406. The printing control program 522 includes a program for manufacturing the gradation correction chart 102 shown in FIG. 6.

The measurement control program 524 corresponds to measurement control applied to the measuring device 410. The drying control program 526 corresponds to drying control applied to the drying device 412. The gradation correction data generation program 528 corresponds to generation of correction data applied to the gradation correction process and the gradation correction process.

Various types of programs stored in the computer-readable medium 504 include one or more commands. The computer-readable medium 504 stores various types of data, various types of parameters, and the like. The memory 474 shown in FIG. 10 is included in the computer-readable medium 504 shown in FIG. 11.

The computer-readable medium 504 can function as a first storage that stores the gradation correction data generation program 528. The computer-readable medium 504 can function as a second storage that stores the transport control program 520, the printing control program 522, and the drying control program 526. The computer-readable medium 504 can function as a third storage that stores the measurement control program 524.

In the ink jet printing system 400, the processor 502 executes various types of programs stored in the computer-readable medium 504 and realizes various types of functions of the ink jet printing system 400. The term "program" is synonymous with the term "software".

The control device 500 executes data communication with an external device via the communication interface 506. Various standards such as universal serial bus (USB) can be applied to the communication interface 506. Any one of wired communication or wireless communication may be applied to a communication form of the communication interface 506.

The input device 512 and the display device 514 are connected to the control device 500 via the input and output interface 508. An input device, such as a keyboard and a mouse, is applied to the input device 512. The display device 514 displays various types of information applied to the control device 500.

A liquid crystal display, an organic EL display, a projector, and the like can be applied to the display device 514. Any combination of a plurality of devices can be applied to the display device 514. EL of an organic EL display is an abbreviation of electro-luminescence. The display device 514 shown in FIG. 11 corresponds to the display device 16 shown in FIG. 1.

Herein, examples of a hardware structure of the processor 502 include a CPU, a GPU, a programmable logic device (PLD), and an application specific integrated circuit (ASIC). The CPU is a general-purpose processor that executes a program and that acts as various types of functional units. The GPU is a processor specialized in image processing.

The PLD is a processor that can change a configuration of an electric circuit after manufacturing a device. An example of the PLD includes a field programmable gate array (FPGA). The ASIC is a processor comprising a dedicated electric circuit specifically designed to execute a specific process.

One processing unit may be configured by one of the various types of processors or may be configured by two or more processors of the same type or different types. Examples of a combination of various types of processors include a combination of one or more FPGAs and one or more CPUs and a combination of one or more FPGAs and one or more GPUs. Another example of a combination of various types of processors includes a combination of one or more CPUs and one or more GPUs.

A plurality of functional units may be configured by using one processor. An example of configuring a plurality of functional units by using one processor includes an aspect in which, as typified by a computer such as a client and a server, one processor is configured by a combination of one or more CPUs and software such as a system on a chip (SoC), and the processor is caused to act as a plurality of functional units.

Another example of configuring a plurality of functional units by using one processor includes an aspect in which a processor that realizes functions of an entire system including a plurality of functional units by using one IC chip is used. IC is an abbreviation of an integrated circuit.

As described above, various types of functional units are configured by using one or more of the various types of processors described above as a hardware structure. Further, the hardware structure of the various types of processors is, more specifically, an electric circuit (circuitry) in which circuit elements, such as semiconductor elements, are combined.

The computer-readable medium 504 can include a semiconductor element such as a read only memory (ROM) and a random access memory (RAM). The computer-readable medium 504 can include a magnetic storage medium such as a hard disk. The computer-readable medium 504 can be provided with a plurality of types of storage media.

[Chart Manufacturing Method According to First Embodiment]

Figure 12:
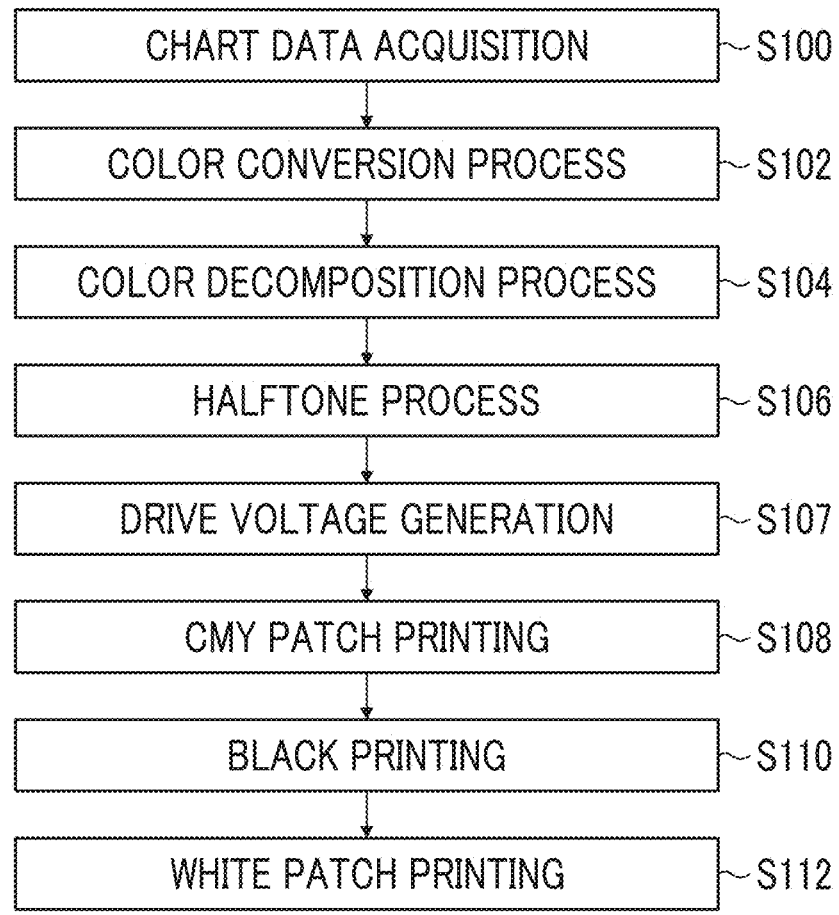
FIG. 12 is a flowchart showing procedures of a chart manufacturing method according to a first embodiment.

FIG. 12 is a flowchart showing procedures of a chart manufacturing method according to a first embodiment. FIG. 12 shows each of steps and procedures applied to the gradation correction chart printing step S12 shown in FIG. 3. FIG. 12 shows procedures in a case where the ink jet printing system 400 shown in FIG. 9 is applied as the printer 14 shown in FIG. 1.

In a chart data acquisition step S100, the printing control unit 466 shown in FIG. 10 acquires gradation correction chart data applied in a case where the gradation correction chart 102 shown in FIG. 5 is printed. After the chart data acquisition step S100, the process proceeds to a color conversion step S102.

In the color conversion step S102, the printing control unit 466 converts the gradation correction chart data into gradation correction chart data represented using an ink color. In a case where the gradation correction chart data is represented using the ink color, the color conversion step S102 is omitted. After the color conversion step S102, the process proceeds to a color decomposition step S104.

In the color decomposition step S104, the printing control unit 466 executes color decomposition on the gradation correction chart data represented using the ink color and generates gradation correction chart data for each ink color. After the color decomposition step S104, the process proceeds to a halftone process step S106.

In the halftone process step S106, the printing control unit 466 executes a halftone process on gradation correction chart data for each ink color and generates a halftone image of the gradation correction chart data for each ink color. After the halftone process step S106, the process proceeds to a drive voltage generating step S107.

In the drive voltage generating step S107, the printing control unit 466 generates a drive voltage for each ink color based on the halftone image of the gradation correction chart for each ink color. In other words, in the drive voltage generating step S107, a drive voltage for each ink jet head is generated. After a drive voltage generating step S107, the process proceeds to a CMY patch printing step S108.

In the CMY patch printing step S108, the printing control unit 466 prints the cyan patch group 112C using the ink jet head 420C shown in FIG. 9. In addition, in the same step, the printing control unit 466 prints the magenta patch group 112M using the ink jet head 420M and prints the yellow patch group 112Y using the ink jet head 420Y.

In a black printing step S110, the printing control unit 466 prints the first measurement start position mark 106, the process color patch group 112, and the black measurement background image 130 using the ink jet head 420K.

In a white patch printing step S112, the printing control unit 466 prints the second measurement start position mark 108, the first white patch group 120, and the second white patch group 122 using the ink jet head 420W.

The CMY patch printing step S108, the black printing step S110, and the white patch printing step S112 are executed at a timing when the substrate 401 passes through an ink jet head of each color. In a case where the gradation correction chart 102 shown in FIG. 5 is printed via each step shown in FIG. 12, the gradation correction data generation method shown in FIG. 3 transitions from the gradation correction chart printing step S12 to the gradation correction chart measuring step S14.

The order of the CMY patch printing step S108 and the black printing step S110 may be exchanged according to disposition of the ink jet head of each color. For example, in a case where the ink jet head of each color is disposed in the order of black, cyan, magenta, yellow, and white from the upstream side in the substrate transport direction, the CMY patch printing step S108 is executed after the black printing step S110.

[Specific Example of Gradation Correction Chart]

Figure 13:
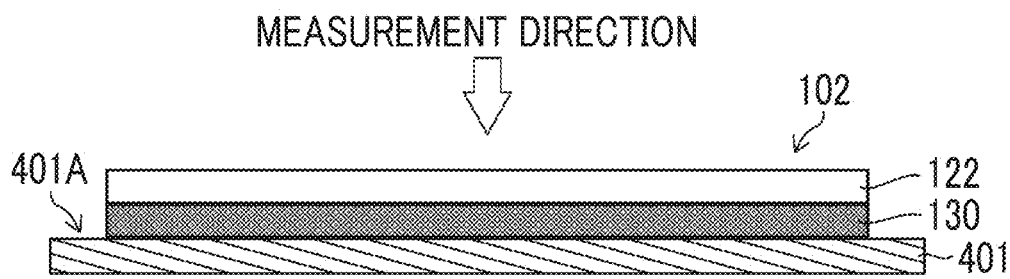
FIG. 13 is a cross sectional view schematically showing a gradation correction chart manufactured by applying a gradation correction chart manufacturing method according to the first embodiment.

FIG. 13 is a cross sectional view schematically showing a gradation correction chart manufactured by applying the chart manufacturing method according to the first embodiment. FIG. 13 shows a cross sectional view of positions where the second white patch group 122 and the black measurement background image 130 in the gradation correction chart 102 shown in FIG. 5 are printed. FIG. 13 shows a measurement direction of the gradation correction chart 102.

In the gradation correction chart 102 shown in FIG. 13, the black measurement background image 130 is printed on a printed surface 401A of the substrate 401, and the second white patch group 122 is printed to be superimposed on the black measurement background image 130.

[Operational Effects of Chart Manufacturing Apparatus and Chart Manufacturing Method According to First Embodiment]

The chart manufacturing apparatus and the chart manufacturing method according to the first embodiment can obtain the following operational effects.

[1]

In the gradation correction chart 102 in which the first white patch group 120 and the second white patch group 122 are printed, the black measurement background image 130, which is a background of the second white patch group 122, is printed. Accordingly, the first white patch group 120 and the second white patch group 122 using two types of backgrounds having colors different from each other can be measured using only the white background 202 without switching from the white background 202 to a black background.

[2]

The gradation correction chart 102 is measured using the white background 202. Accordingly, high-accuracy registration of the first white patch group 120, the second white patch group 122, and the white background 202 is unnecessary.

[Chart Manufacturing Apparatus According to Second Embodiment]

Figure 14:
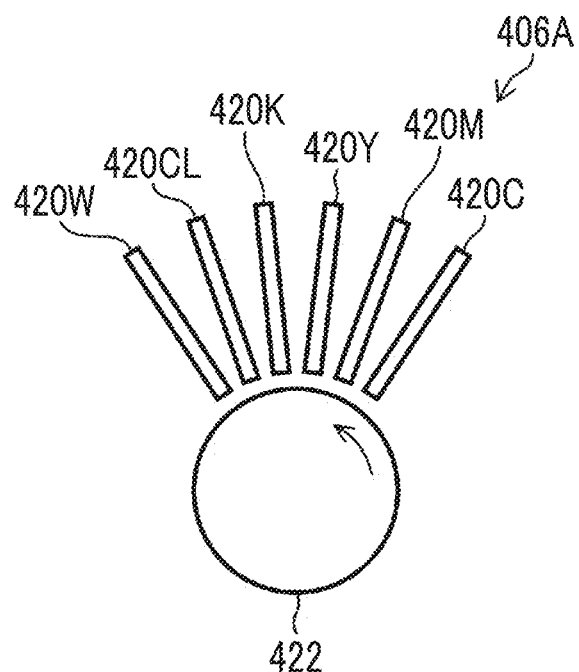
FIG. 14 is a configuration diagram showing a configuration example of a printing device applied to a chart manufacturing apparatus according to a second embodiment.

FIG. 14 is a configuration diagram showing a configuration example of a printing device applied to a chart manufacturing apparatus according to a second embodiment. In the printing device 406A shown in FIG. 14, an ink jet head 420CL is added to the printing device 406 shown in FIG. 9.

The ink jet head 420CL is disposed between the ink jet head 420K and the ink jet head 420W. A clear ink is applied to the ink jet head 420CL.

An example of the clear ink includes an ink obtained by removing a component related to a coloring material from a process ink. The clear ink can be referred to as a transparent ink in some cases. Being transparent herein may mean that the transmittance of a visible light ray is less than 100 percent. The transmittance of the clear ink may be a value that does not decrease the visibility of a white ink and a black ink printed to be superimposed on each other by a certain level or more.

Figure 15:
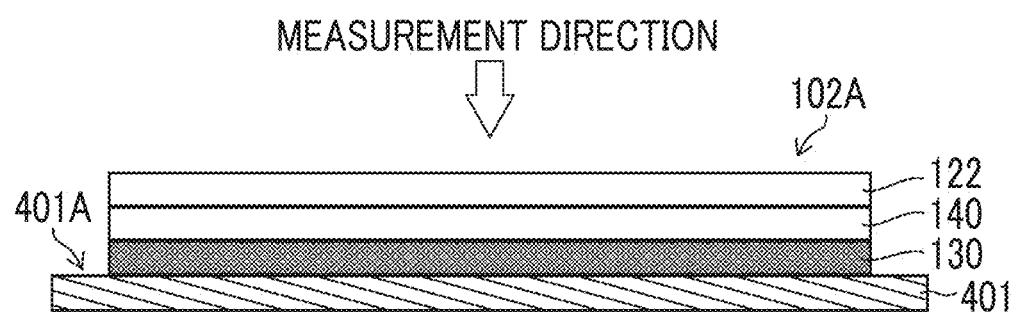
FIG. 15 is a cross sectional view schematically showing a chart manufactured by applying the chart manufacturing apparatus according to the second embodiment.

FIG. 15 is a cross sectional view schematically showing a chart manufactured by applying the chart manufacturing apparatus according to the second embodiment. In a gradation correction chart 102A shown in FIG. 15, a clear ink image 140 is printed to be superimposed on the black measurement background image 130, and the second white patch group 122 is printed to be superimposed on the clear ink image 140.

The clear ink image 140 may be printed to be superimposed on the entire surface of the black measurement background image 130 or may be printed only between the black measurement background image 130 and the second white patch group 122.

[Chart Manufacturing Method According to Second Embodiment]

FIG. 15 shows a chart manufacturing method according to the second embodiment, and a clear ink image printing step of printing a clear ink image is executed after the black printing step S110 shown in FIG. 12. In addition, the white patch printing step S112 is executed after the clear ink image printing step.

[Operational Effects of Chart Manufacturing Apparatus and Chart Manufacturing Method According to Second Embodiment]

The chart manufacturing apparatus and the chart manufacturing method according to the second embodiment can obtain the same operational effects as in the first embodiment. In addition, the clear ink image 140 to which a clear ink is applied is printed between the second white patch group 122 to which a white ink is applied and the black measurement background image 130 to which a black ink is applied.

Accordingly, color mixing of a white ink and a black ink can be suppressed, light scattering occurred due to mixing of the white ink and the black ink at a boundary surface between the white ink and the black ink can be suppressed, and the gradation correction chart 102A with relatively great contrast can be printed.

The clear ink described in the embodiment is an example of a transparent coloring material. The clear ink image 140 described in the embodiment is an example of a transparent image.

Chart Manufacturing Apparatus According to Third Embodiment

Figure 16:
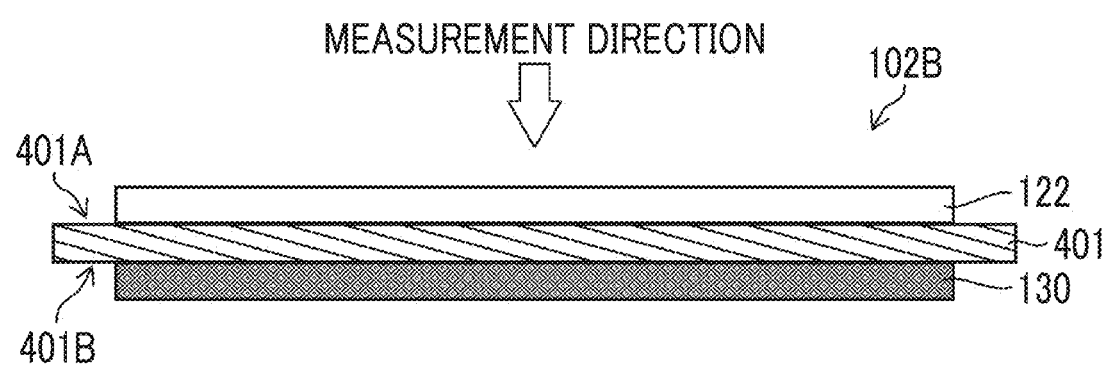
FIG. 16 is a cross sectional view schematically showing a chart manufactured by applying a chart manufacturing apparatus and a chart manufacturing method according to a third embodiment.

FIG. 16 is a cross sectional view schematically showing a chart manufactured by applying a chart manufacturing apparatus and a chart manufacturing method according to a third embodiment. In a gradation correction chart 102B shown in FIG. 16, the second white patch group 122 is printed on the printed surface 401A which is one surface of the substrate 401.

In addition, the black measurement background image 130 is printed on a back surface 401B which is the other surface of the substrate 401. The black measurement background image 130 is printed in a region of the back surface 401B, which corresponds to a region of the printed surface 401A of the substrate 401 where the second white patch group 122 is printed.

A double-sided printing device that performs printing on both sides of the substrate 401 is applied to the chart manufacturing apparatus according to the third embodiment. The double-sided printing device comprises a substrate reversing mechanism that reverses the printed surface 401A and the back surface 401B of the substrate 401.

[Chart Manufacturing Method According to Third Embodiment]

In the chart manufacturing method according to the third embodiment, instead of the CMY patch printing step S108 shown in FIG. 12, a step of printing the cyan patch group 112C, the magenta patch group 112M, the yellow patch group 112Y, and the black patch group 112K is executed.

The black printing step S110 is omitted, and the white patch printing step S112 is executed. After then, a substrate reversing step is executed, and a step of printing the black measurement background image 130 is executed after the substrate reversing step is executed.

In the chart manufacturing method according to the third embodiment, the substrate reversing step is executed after the step of printing the black measurement background image 130 is executed, and the CMY patch printing step S108 and the white patch printing step S112 may be executed after the substrate reversing step is executed.

[Operational Effects of Chart Manufacturing Apparatus and Chart Manufacturing Method According to Third Embodiment]

The chart manufacturing apparatus and the chart manufacturing method according to the third embodiment can obtain the same operational effects as in the first embodiment and the second embodiment. In addition, a decrease in the contrast of the second white patch group 122 is suppressed. Further, an ink amount of a white ink applied to the second white patch group 122 and an ink amount of a black ink applied to the black measurement background image 130 can be relatively increased.

[Chart Manufacturing Apparatus and Chart Manufacturing Method According to Fourth Embodiment]

Figure 17:
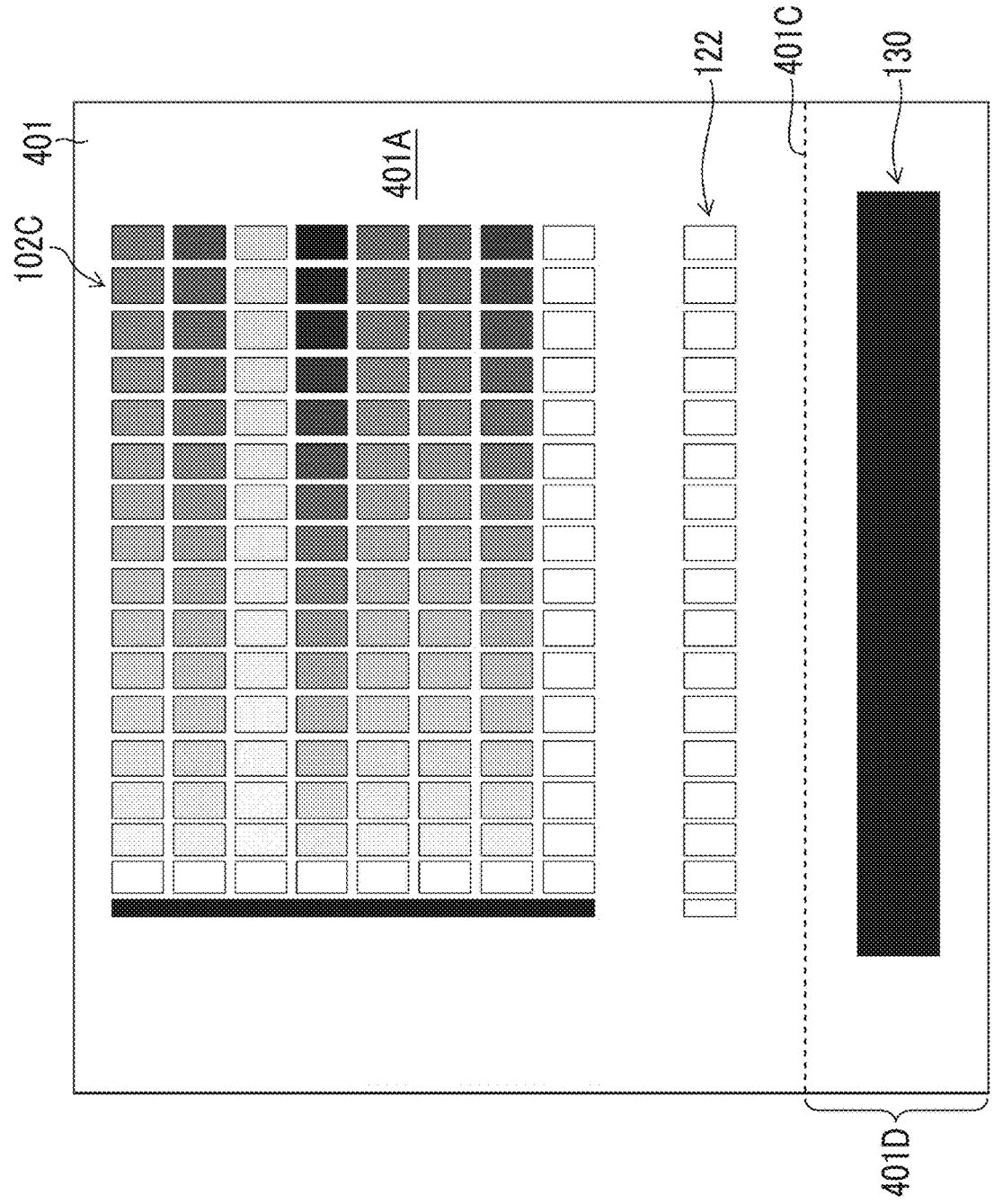
FIG. 17 is a cross sectional view schematically showing a chart manufactured by applying a chart manufacturing apparatus according to a fourth embodiment.

FIG. 17 is a cross sectional view schematically showing a chart manufactured by applying a chart manufacturing apparatus according to a fourth embodiment. The ink jet printing system 400 shown in FIGS. 9 and 10 is applied to the chart manufacturing apparatus according to the fourth embodiment. In addition, the flowchart shown in FIG. 12 is applied to a chart manufacturing method according to the fourth embodiment.

In a gradation correction chart 102C shown in FIG. 17, the black measurement background image 130 is printed in a region 401D of the printed surface 401A of the substrate 401 on a side opposite to the second white patch group 122 with a folding-back line 401C interposed therebetween. The black measurement background image 130 may be printed on the back surface 401B of the substrate 401.

FIG. 18 is a schematic diagram showing a measurement state of the chart shown in FIG. 17. As shown in FIG. 18, the black measurement background image 130 is printed at a position superimposed on the second white patch group 122 in a case where the substrate 401 is folded at the folding-back line 401C.

[Operational Effects of Chart Manufacturing Apparatus and Chart Manufacturing Method According to Fourth Embodiment]

The chart manufacturing apparatus and the chart manufacturing method according to the fourth embodiment are an apparatus and a method that can perform printing only on the printed surface 401A of the substrate 401. Even in a case where the black measurement background image 130 and the second white patch group 122 cannot be printed to be superimposed on each other, the second white patch group 122 and the black measurement background image 130 can be printed on the printed surface 401A of the substrate 401.
[Modification Example of Gradation Correction Chart]

In the gradation correction chart 102 or the like, the first white patch group 120 may not be printed. Such an aspect is applied to a case where a patch of a white ink is measured using a black background, and a patch of an ink other than white is measured using a white background.

In addition, in the gradation correction chart 102 or the like, a patch group having a color other than the first white patch group 120 and the second white patch group 122, such as the cyan patch group 112C, may not be printed.

In the gradation correction chart 102 or the like, a white measurement background image that functions as a white background may be printed. For example, a white measurement background image having a color different from the black measurement background image 130 is printed on the entire surface of the substrate 100, a region where the black measurement background image 130 is not printed, a region where the first white patch group 120 is printed, and the like in the substrate 100 using a white ink.

With such an aspect, it is not necessary to form the white background 202 at the stage 201 that supports the gradation correction chart 102. In addition, even in a case where contamination, damage, or the like of the white background 202 occurs, measurement in which an effect of contamination or the like of the white background 202 is suppressed can be performed. The white measurement background image described in the embodiment is an example of a second measurement background image.

Modification Example of Background

A covering ratio applied to management of an ink is an indicator indicating how opaque a layer under the ink and a base of a substrate can be printed in a case where the substrate is covered with the ink. Two types of backgrounds to which colors different from each other are applied in measurement in a case where a covering ratio is derived are not limited to a white background and a black background.

Instead of white, a color similar to the color of each ink can be applied to a white background. Instead of black, the color of a substrate or the color of a support surface that supports the substrate can be applied to a black background.

In a case where a covering ratio of a white ink printed on a transparent substrate is derived, the first white patch group 120 is measured with a color similar to the white ink applied to the first white patch group 120 shown in FIG. 5 as a background. In addition, by applying a black background in which the white ink applied to the second white patch group 122 is likely to be affected by a watermark of a background color, the second white patch group 122 is measured. Based on a measurement result of the first white patch group 120 and a measurement result of the second white patch group 122, a degree to which the white ink blocks the background color is derived.

An example of an ink of which a degree to which a background color is found to be blocked includes a cyan ink in a case where an image such as a logo character is printed on a substrate of which a surface color is red using a cyan ink. Another example includes the cyan ink in a case where a printed material obtained by printing an image such as a logo character using the cyan ink on a transparent substrate is attached to a support plate of which a surface color is red.

In the example described above, in a case where the color of the logo character is not printed at a density in which the color of the background is not transparent, the visibility of the logo character decreases, and the quality of the printed material is decreased. In the example described above, a patch of the cyan ink is measured by applying a background of a cyan ink or a background of a color similar to the cyan ink, and the patch of the cyan ink is measured by applying a background of red, which is a color of a substrate, or a background of a color similar to red.

$Y_2/Y_1$ is derived as a covering ratio from a measurement result $Y_1$ to which a background of a cyan ink or the like is applied and a measurement result $Y_2$ to which a background of red or the like is applied, and the density of the cyan ink is managed such that the covering ratio $Y_2/Y_1$ is equal to or greater than a certain value.

Although description has been made with a cyan ink and red as examples herein, the same applies to a process ink such as a magenta ink and a special color ink such as a green ink.

That is, for any ink color, a color of a base of a substrate, a color similar to the color of the base of the substrate, a color of a support surface that supports the substrate, or a color similar to the color of the support surface that supports the substrate is set as a first background color corresponding to a black background, and an ink color or a color similar to the ink color can be applied as a second background color corresponding to a white background.
[Coverage of Measurement Background Image]

In a case where ink coverage of a measurement background image is relatively low, since an effect corresponding to a background color weakens, the measurement background image requires relatively high ink coverage. In a case of printing using the ink jet method, ink coverage is not 100 percent due to a slight shift in a dot formation position.

Thus, the measurement background image is less than 100 percent, and a certain level of ink coverage or higher is allowed. For example, the ink coverage of the measurement background image can be set to 85 percent or more. The measurement background image is a general term for the black measurement background image 130 and the white measurement background image.
[Application Example to Image Forming System]

Although the ink jet printing system 400 comprising the printing device 406 using the ink jet method has been given as an example of the image forming system in the present embodiment, gradation correction data according to the embodiment can also be applied to an image forming method other than the ink jet method such as an image forming system comprising an image forming device using an electrophotographic method.
[Regarding Image]

The term "image" is to be construed in a broad sense and can include a color image, a black-and-white image, a monochromatic image, a gradation image, a uniform density image, and a solid image. The image is not limited to a photographic image and is used as a collective term including a design, a character, a symbol, a line drawing, a mosaic pattern, a color-coding pattern, and other various types of patterns. The image can include an appropriate combination of the above.
[Printing of Image]

Printing of an image can include the concepts of terms such as formation, recording, typing, drawing, and a print of an image.

In the embodiments of the present invention described above, configuration requirements can be appropriately changed, added, or deleted without departing from the gist of the present invention. The present invention is not limited to the embodiments described above, and many modifications can be made by those having ordinary knowledge in the field within the technical idea of the present invention.

EXPLANATION OF REFERENCES

10: gradation correction data generation apparatus
12: measuring instrument
14: printer
16: display device
16A: printer operation screen
20: image data storage unit
22: printer control unit
24: instrument control unit
26: gradation correction LUT generation unit
28: LUT storage unit
30: correction processing unit
31: gradation correction processing unit
52: in-plane unevenness correction processing unit
54: non-jetting correction processing unit
60: straight line
62: curve
64: curve
66: curve
100: substrate
102: gradation correction chart
102A: gradation correction chart
102B: gradation correction chart
102C: gradation correction chart
106: first measurement start position mark
108: second measurement start position mark
110: patch
110C: cyan patch
110K: black patch
110M: magenta patch
110Y: yellow patch
112: process color patch group
112C: cyan patch group
112K: black patch group
112M: magenta patch group
112Y: yellow patch group
114: special color patch
114G: green patch
1140: orange patch
114V: violet patch
120: first white patch group
122: second white patch group
124: first white patch
126: second white patch
130: black measurement background image
140: clear ink image
201: stage
201A: substrate support surface
202: white background
300: drive waveform
302: jetting drive pulse
304: jetting drive pulse
306: jetting drive pulse
308: jetting drive pulse
310: jetting drive pulse
312: jetting drive pulse
314: reverberation suppression waveform element
400: ink jet printing system
401: substrate
401A: printed surface
401B: back surface
401C: folding-back line
401D: region
402: substrate supply device
404: first intermediate transport device
406: printing device
406A: printing device
408: second intermediate transport device
410: measuring device
412: drying device
414: accumulation device
420C: ink jet head
420CL: ink jet head
420K: ink jet head
420M: ink jet head
420W: ink jet head
420Y: ink jet head
422: printing drum
430: density instrument
432: reading transport roller
434: stage
460: system control unit
462: transport control unit
464: transport device
466: printing control unit
468: measurement control unit
470: drying control unit
472: information acquisition unit
474: memory
476: sensor
500: control device
502: processor
504: computer-readable medium
506: communication interface
508: input and output interface
510: bus
512: input device
514: display device
520: transport control program
522: printing control program
524: measurement control program
526: drying control program
528: gradation correction data generation program
S10 to S18: each step of gradation correction LUT generation method
S100 to S112: each step of gradation correction chart printing step

What is claimed is:

1. A chart manufacturing apparatus comprising:
an image forming device that forms, on a transparent substrate, a chart measured by applying a first background color and a second background color which are colors different from each other;
one or more processors; and
a storage that stores a program executed using the one or more processors,
wherein the one or more processors are configured to:
execute a command of the program;
form a first measurement background image on one surface of the transparent substrate using a coloring material corresponding to the first background color;
form a first patch group to be superimposed on the first measurement background image, including one or more first patches using a coloring material of a first color at a position of the transparent substrate, which corresponds to the first measurement background image; and form a second patch group including one or more second patches at a position of the transparent substrate where the first measurement background image is not formed.

2. The chart manufacturing apparatus according to claim 1,
wherein the one or more processors are configured to:
form a transparent image to which a transparent coloring material is applied to be superimposed on the first measurement background image; and
form the first patch group to be superimposed on the transparent image.

3. The chart manufacturing apparatus according to claim 1,
wherein the one or more processors are configured to:
form the first patch group on one surface of the transparent substrate; and
form the first measurement background image at a position of the other surface of the transparent substrate, which corresponds to a position of the first patch group.

4. The chart manufacturing apparatus according to claim 1,
wherein the one or more processors are configured to:
form the first patch group on one surface of the transparent substrate; and
form the first measurement background image at a position superimposed on the first patch group in a case where the transparent substrate is folded back along a folding-back line.

5. The chart manufacturing apparatus according to claim 1,
wherein the one or more processors are configured to form the second patch using the coloring material of the first color.

6. The chart manufacturing apparatus according to claim 5,
wherein the one or more processors are configured to:
form the first patch and the second patch using a white coloring material as the coloring material of the first color; and
form the first measurement background image using a black coloring material as the coloring material corresponding to the first background color.

7. The chart manufacturing apparatus according to claim 1,
wherein the one or more processors are configured to form the second patch using a coloring material of a second color different from the coloring material of the first color.

8. The chart manufacturing apparatus according to claim 7,
wherein the one or more processors are configured to:
form the first patch using a white coloring material as the coloring material of the first color;
form the second patch using a coloring material of at least one process color as the second color; and
form the first measurement background image using a black coloring material as the coloring material corresponding to the first background color.

9. The chart manufacturing apparatus according to claim 1,
wherein the one or more processors are configured to form a second measurement background image at a position corresponding to a position of the second patch group using a coloring material corresponding to the second background color.

10. The chart manufacturing apparatus according to claim 9,
wherein the one or more processors are configured to form the second measurement background image using a white coloring material as the coloring material corresponding to the second background color.

11. The chart manufacturing apparatus according to claim 9,
wherein the one or more processors are configured to form the second measurement background image that has coverage of 85 percent or more.

12. The chart manufacturing apparatus according to claim 1,
wherein the one or more processors are configured to:
form the first patch using a white coloring material as the coloring material of the first color; and
form the first measurement background image using a black coloring material as the coloring material corresponding to the first background color.

13. The chart manufacturing apparatus according to claim 1,
wherein the one or more processors are configured to form the first measurement background image that has coverage of 85 percent or more.

14. The chart manufacturing apparatus according to claim 1,
wherein the one or more processors are configured to form the second patch to which the same gradation value as the first patch is applied.

15. The chart manufacturing apparatus according to claim 1,
wherein the one or more processors are configured to:
form the first patch group in which a plurality of the first patches having gradation values different from each other are disposed along a transport direction of the transparent substrate; and
form the second patch group in which a plurality of the second patches of the same color having gradation values different from each other are disposed along the transport direction of the transparent substrate.

16. A chart manufacturing method of forming, on a transparent substrate, a chart measured by applying a first background color and a second background color which are colors different from each other, the method comprising:
causing a computer to:
form a first measurement background image on one surface of the transparent substrate using a coloring material corresponding to the first background color;
form a first patch group to be superimposed on the first measurement background image, including one or more first patches using a coloring material of a first color at a position of the transparent substrate, which corresponds to the first measurement background image; and
form a second patch group including one or more second patches at a position of the transparent substrate where the first measurement background image is not formed.

17. A non-transitory, computer-readable tangible recording medium in which a program for causing, when read by a computer, the computer to execute the chart manufacturing method according to claim 16 is recorded.

18. An image forming system comprising:
an image forming device that forms, on a transparent substrate, a chart measured by applying a first background color and a second background color which are colors different from each other;

one or more processors; and
a storage that stores a program executed using the one or more processors,
wherein the one or more processors are configured to:
execute a command of the program;
form a first measurement background image on one surface of the transparent substrate using a coloring material corresponding to the first background color;
form a first patch group to be superimposed on the first measurement background image, including one or more first patches using a coloring material of a first color at a position of the transparent substrate, which corresponds to the first measurement background image; and
form a second patch group including one or more second patches at a position of the transparent substrate where the first measurement background image is not formed.

* * * * *